United States Patent [19]

Andermo

[11] Patent Number: 5,239,307
[45] Date of Patent: Aug. 24, 1993

[54] METHOD AND APPARATUS FOR SENSING OF POSITION

[75] Inventor: Ingvar Andermo, Kirkland, Wash.

[73] Assignee: Micro Encoder Inc., Kirkland, Wash.

[21] Appl. No.: 830,543

[22] Filed: Jan. 31, 1992

Related U.S. Application Data

[63] Continuation of Ser. No. 419,596, Oct. 10, 1989, abandoned.

[51] Int. Cl.[5] .................. G01B 7/30; G08C 19/10; G01D 5/24
[52] U.S. Cl. ..................... 340/870.37; 324/660; 324/662; 324/686; 324/688; 178/87
[58] Field of Search ............ 324/660, 661, 686, 690, 324/207.23; 340/870.37, 870.30; 178/87

[56] References Cited

U.S. PATENT DOCUMENTS

| | | |
|---|---|---|
| 3,138,714 | 6/1964 | Heldenhain . |
| 3,812,352 | 5/1974 | McGovern . |
| 3,956,618 | 5/1976 | Gotz ................... 324/207.23 |
| 4,152,837 | 5/1979 | Nelle . |
| 4,218,615 | 8/1980 | Zinn . |
| 4,275,505 | 6/1981 | Delmas . |
| 4,420,754 | 10/1983 | Andermo .............. 340/870.37 |
| 4,495,701 | 1/1985 | Nakadoi . |
| 4,603,480 | 8/1986 | Sakagami . |
| 4,627,753 | 12/1986 | Kent et al. ................. 33/366 |
| 4,639,667 | 1/1987 | Andresen ............... 324/207.23 |
| 4,644,261 | 2/1987 | Carter ..................... 340/870.37 |
| 4,697,144 | 9/1987 | Howbrook ............. 324/207.23 |
| 4,890,392 | 1/1990 | Komura . |
| 4,893,071 | 1/1990 | Miller ....................... 324/660 |

FOREIGN PATENT DOCUMENTS

| | | |
|---|---|---|
| 0065625 | 4/1982 | European Pat. Off. . |
| 0248165 | 12/1987 | European Pat. Off. . |
| 1323847 | 7/1987 | U.S.S.R. . |
| 1366284 | 9/1974 | United Kingdom . |
| 1550185 | 5/1979 | United Kingdom . |
| 2060173 | 9/1980 | United Kingdom . |
| 8802848 | 4/1988 | World Int. Prop. O. . |

*Primary Examiner*—Kenneth A. Wieder
*Assistant Examiner*—Jose M. Solis
*Attorney, Agent, or Firm*—Seed and Berry

[57] ABSTRACT

A method and apparatus for sensing both axial and angular displacements of a collar relative to a shaft. The invention provides transmitting and receiving electrodes on the shaft and coupling electrodes on the collar. Displacements in the axial or angular directions vary the amount of signal conveyed between the electrodes relative to the quantities sought to be measured. An electronic package provides the appropriate signals and allows multiplexing of the data.

90 Claims, 14 Drawing Sheets

METHOD AND APPARATUS FOR SENSING OF POSITION

CROSS-REFERENCE TO RELATED APPLICATION

This application is a continuation of U.S. application Ser. No. 07/419,596, filed Oct. 10, 1989, now abandoned.

FIELD OF INVENTION

This invention pertains to position sensors, particularity to sensors of angular and axial position. With still greater particularity the invention pertains to the simultaneous sensing of both the angular and axial position of a collar on a shaft by capacitive means.

BACKGROUND OF THE INVENTION

In many application it is desirable to know at a remote location the exact position of a collar on a shaft. Such applications include the automotive and aircraft industries or any other area where mechanical relationships of parts are of interest.

Several types of sensors have been developed for such applications. The simplest sensor would be a mechanical linkage from the part sought to be monitored to a dial. Such sensors become generally impractical where the area where the information is needed is a distance from the part being monitored.

To overcome the limitations of mechanical sensors many types of electrical sensors have been developed. Such sensors include potentiometer, magnetic pickups of various types, optical pickups, and capacitive pickups. In the common application of a servo system the pickups are generally potentiometer or resolvers.

In these general applications the property being measured is angular position. In those cases where longitudinal position is sought to be sensed a mechanical linkage is often provided to convert the longitudinal position into an angular position. In some cases a sensor specially adapted to sense longitudinal position is provided.

In those applications where it is desired to determine both the angular and axial position of one part relative to another a combination of two sensors is generally used. As an alternative a single sensor has been proposed which may be altered in position to sense both factors.

In applications such as inside a drive train or engine the sensor must be capable of working this environment for extended periods of time at elevated temperatures and pressures. It is also desirable if the sensor can function as a bearing between the two parts. Accordingly there is a need for a sensor that can provide information about both the angular and axial relative position of two parts while it functions as a bearing.

SUMMARY OF THE INVENTION

The invention provides a sensor which is capable of sensing both angular and axial position of a collar to a shaft. There is no need to reposition the sensor to measure the separate factors. The sensor is capable of operating in motors and drivetrains. The electrical signals to each set of electrodes and to sense the output from the appropriate set of electrodes. The electronic package is further capable of multiplexing the signals and decoding the signals.

In operation a alternating current signal is applied to one half of the electrodes on the shaft denominated as the transmitting electrodes. The other half of the electrodes on the shaft, the receiving electrodes are connected to the input of an amplifier. The signal is conveyed from the transmitting electrodes to the receiving electrodes by capacitive coupling via the electrodes on the collar. The amount of signal conveyed is proportional to the position of the collar on the shaft. This relationship is fixed by the geometric configuration of the two sets of electrodes. This configuration may be varied to sense different amounts of rotation and to provide greater accuracy.

DETAILED DESCRIPTION OF THE FIGURES

Figure 1:
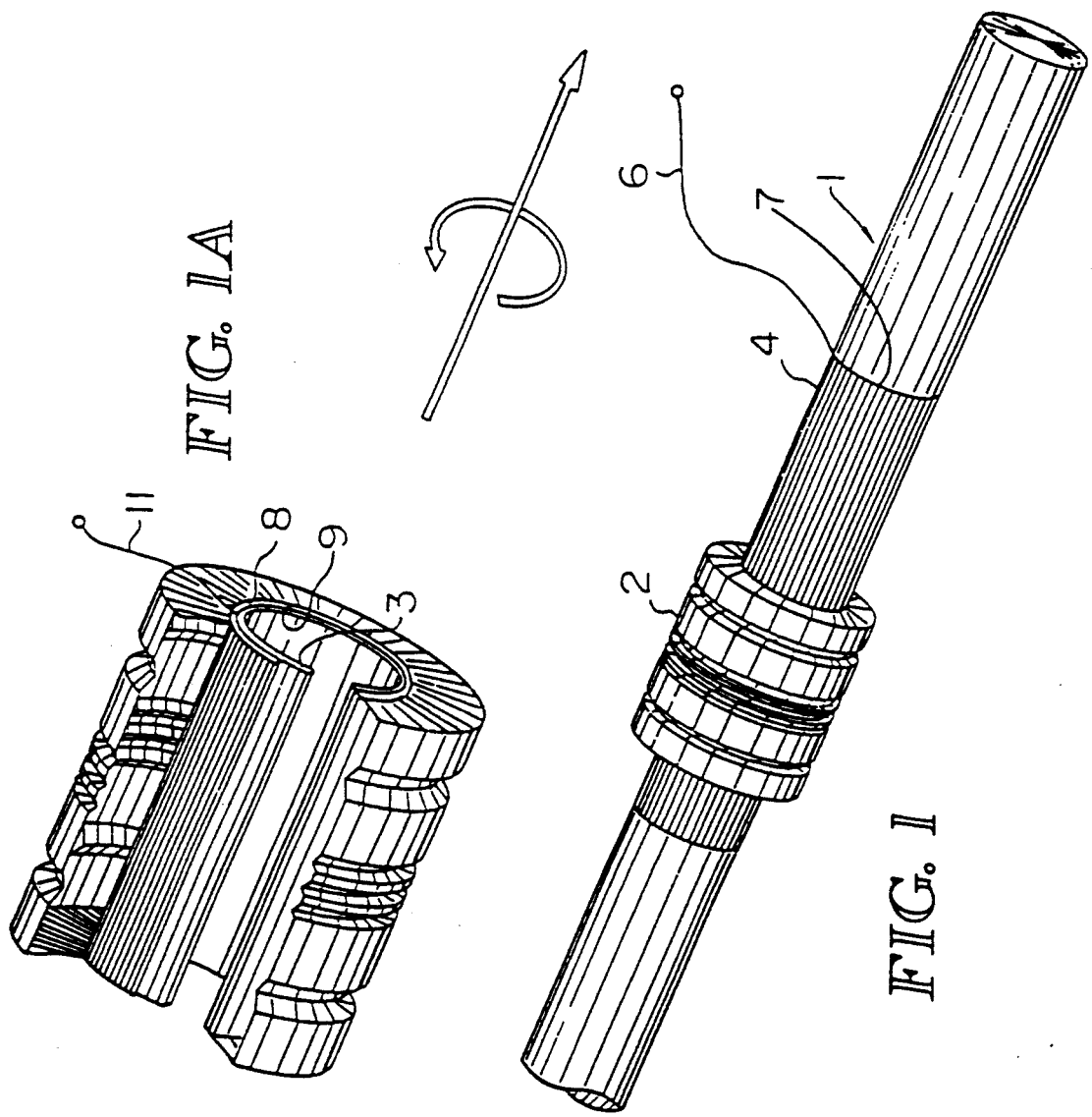
FIG. 1 is an environmental view of the invention.

FIG. 1 is an environmental view of the sensor of the invention. In this embodiment a slider 2 is movable relative to an axle 1. Slider 2 is movable both axially and angularly relative to axle 1. In many applications it is desirable to provide slider 2 with a bearing surface 3 on it's inner circumference. Bearing surface 3 is selected from materials having both a low coefficient of friction and wearing properties. In addition bearing surface 3 should be electrically insulating. Polytetraflouroethylene film has been found to be a suitable material for surface 3 but other materials having similar properties as outlined above could be substituted.

A series of electrodes 4 each having an electrical connection 6 are located on the outer surface of axle 1. Electrodes 4 may be constructed by using a plastic film 7 with a copper coating which is etched by printed circuit technology to form any desired pattern. Common Flexible Printed Circuit material (FPC) can be used for films. The film 7 with attached electrodes 4 is then rolled around axle 1 and fixed with an adhesive.

Similarly, slider 2 is provided with a series of electrodes 8 on its inner circumference 9. Electrodes 8 may be formed of copper foil directly in the outer surface of bearing surface 3. This may be easily accomplished by attaching copper foil to bearing film material by use of a suitable adhesive. Undesired portions of the foil are then etched away. The resulting electrodes 8 may be formed in any desired pattern. The film with attached electrodes is then rolled and attached to collar 2. Electrodes 8 may be provided with electrical connections 11 in some applications.

In use it is apparent that electrodes 4 and 8 are capacitively coupled. By suitable selection of electrical signals and pickups either the angular or axial position of slider 2 on axle 1 may be determined. Fundamental to understanding of the invention is the fact that the inducement of charge in a capacitor is proportional to the capacitance which in turn is proportional to the area of electrodes separated by a dielectric.

Figure 2:
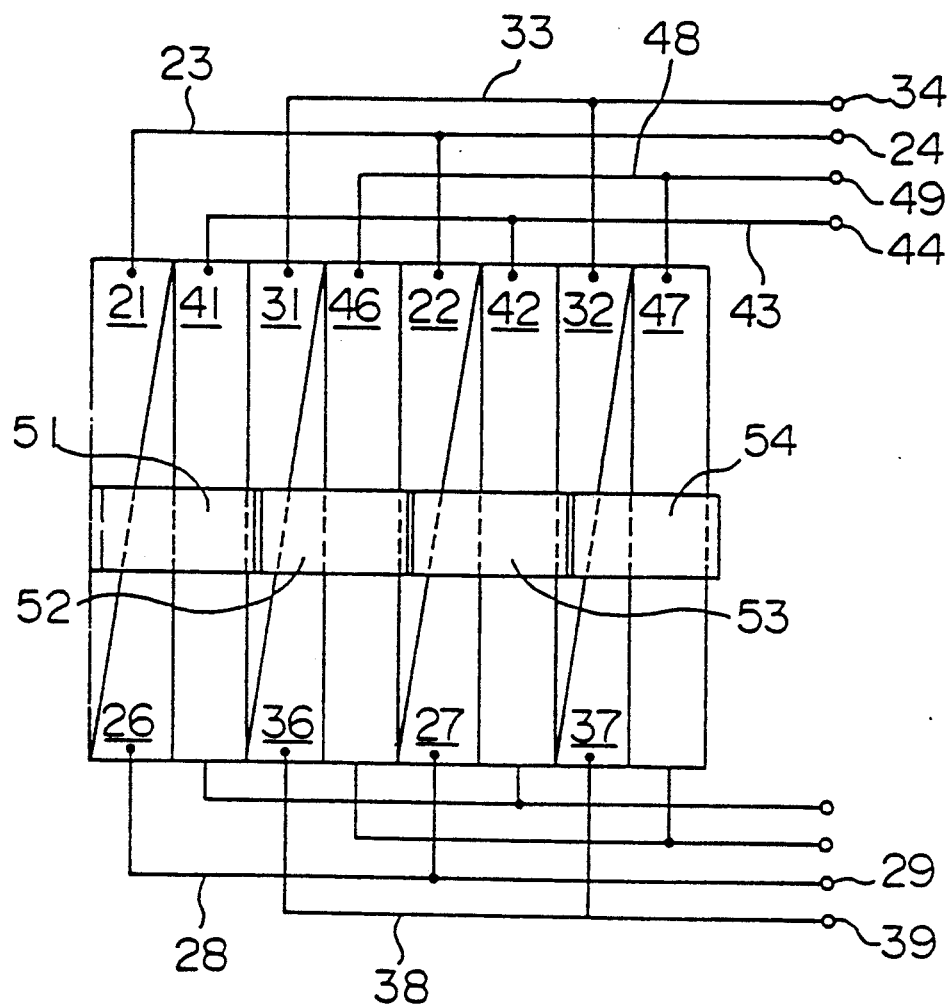
FIG. 2 is a plan view of the unwrapped electrodes of the invention.

FIG. 2 is a plan view of the electrodes attached to axle 1 before rolling. The pattern of electrodes illustrated is desirable for simultaneous measurement of limited angular position and axial position.

In this embodiment there are six sets of electrodes. Each set consists of two electrodes. The number of electrodes in each set will vary dependant upon the size of axle 1 and the degree of accuracy and angular range desired. This embodiment is designed for an angular range of approximately 40 degrees.

The first set of electrodes 21 and 22 are triangular in shape, they are electrically connected together by conductor 23 and are connected at terminal 24 (A1). The second set of electrodes 26 and 27 are triangular in shape, they are electrically connected together by conductor 28 and are connected at terminal 29 (A2). The third set of electrodes 31 and 32 are triangular in shape, they are electrically connected together by conductor 33 and are connected at terminal 34 (C1). The fourth set of electrodes 36 and 37 are triangular in shape, they are electrically connected together by conductor 38 and are connected at terminal 39 (C2). Electrodes 21, 22, 26, 27,31,32,36, and 37 all function as transmitters in this embodiment of the invention.

The fifth set of electrodes 41 and 42 are rectangular in shape, they are electrically connected together by conductor 43 and are connected at terminal 44 (B). The sixth set of electrodes 46 and 47 are rectangular in shape, they are electrically connected together by conductor 48 and are connected at terminal 49 (D). Electrodes 41, 42,46 and 47 all function as receivers in this embodiment of the invention.

The slider also has four electrodes 51,52,53 and 54. In this embodiment of the invention the slider electrodes are rectangular in shape and without electrical connections. Electrodes 51-54 are separate and electrically isolated. Electrodes 51-54 are capacitively coupled to the electrodes on axle 1.

To measure axial displacements transmitting electrodes 21,22,31 and 32 are all connected together. Similarly, transmitting electrodes 26,27,36 and 37 are connected together. The result is two sets of transmitting electrodes. A source of alternating current is connected between the two sets of electrodes this results on a charge being imposed on electrodes 21,22,31, and 32 that is 180 degrees out of phase with that imposed on electrodes 26,27,36, and 37. Similarly all receiving electrodes 41,42,46, and 47 are connected in parallel.

A single set of electrodes 21,26,41, and 51 will now be considered it being realized that the charges on each group of electrodes is identical in this configuration. Electrodes 21 and 26 divide a rectangular area by the diagonal split between them. The voltages on electrodes 21 and 26 in turn induce a charge in the adjacent capacitively coupled slider electrode 51. This charge will vary in magnitude dependant upon the position of slider 2 on axle 1 due to the diagonal split between electrodes 21 and 26. For example if slider 2 is on one end of axle 1 the charge induced will predominantly that opposite of the charge on electrode 21. This is because the area of electrode 21 under electrode 51 is much larger than that of electrode 26. The opposite is true if slider 2 is on the opposite end of axle 1. If slider 2 is in the middle of axle 1 the areas of electrodes 21 and 26 are equal this results in zero charge being introduce in electrode 51 as the equal charges are 180 degrees out of phase and thus cancel. Finally, the charge on slider electrode 51 in turn induces a charge on electrode 41 which is also capacitively coupled to electrode 51. As a result the charge on electrode 41 will vary from a maximum in the positive direction when slider 2 is on one end of axle 1 through zero at the center position to a maximum in the negative direction when slider 2 is on the other end.

As the collar electrodes 51-54 all have equivalent positions relative to any axial electrode group, they all get the same signal potential. Therefore, we can in this working mode consider the collar electrodes equivalent to one ring electrode stretching all the way around the circumference. The signal on electrodes 21+22+31+32 will be coupling to this collar electrode with a capacitance $C \times 1$ that is proportional to the collar position in the transverse direction (the axial direction):

$$C \times 1 = C1 * x/L$$

where L is the length of the tapered pattern on the axle and C1 is the maximum coupling capacitance between electrodes 21+22+31+32 and the collar electrodes. Similarly, the capacitance between the axle electrodes 26+27+36+37 and the collar electrodes is proportional to the collar distance from the other end of the axle tapered pattern:

$$C \times 2 = C1 * (1 - x/L)$$

The capacitance from the collar electrodes to the receiving plates 41+42+46+47 is constant, independent of the collar position relative to the axle. Lets design its value with C2.

When now the electrodes 21+22+31+32 are fed with AC signal with opposite polarity to electrodes 26+27+36+37 we will get a no-load voltage on the collar electrodes that is $$U = V * C \times 1 / (C \times 1 + C \times 2) = V * x/L$$

and a source impedance of $C \times 1 + C \times 2 = C1$ V is the signal amplitude from the signal source (the electronics), assuming a low impedance signal source. With the collar capacitance to electrodes 41+42+46+47 as a load we will get a charge transfer to the charge amplifiers in the electronic unit that is $$Q1 = V^*x/L^*C1^*C2/(C1+C2)$$

In the actual circuit, the electrodes 21+22+31+32 are first fed with the full available signal while electrodes 26+27+36+37 are held at ground potential and the above described charge is transferred to the receiver electronics. Then the electrodes 26+27+36+37 are fed with the full signal while 21+22+31+32 are held at ground potential. The received charge will then be $$Q2 = V^*(1-x/L)^*C1^*C2/(C1+C2)$$

It is to be noticed that when the electrodes are connected in above described configuration there is no influence on the output signal by rotation of the collar because all the collar have the same potential, independent on the angular position.

To measure angular displacements the connections to the electrodes are rearranged. In this embodiment that function is accomplished by the phasing of signals applied to the electrode as described below with the description of the multiplexing system of the invention.

Returning to FIG. 2, the electrodes are described as connected to measure angular displacements. Electrodes 21 and 22 are connected in parallel with electrodes 26 and 27 to form two rectangular transmitting electrodes and are connected to a source of alternating current. Similarly, electrodes 31 and 32 are connected in parallel with electrodes 37 and 38 to form a second set of rectangular transmitting electrodes. Electrodes 31,32,37, and 38 are connected to a source of alternating current that is 180 degrees out of phase with that connected to electrodes 21,22,26, and 27. This completes the connections to the transmitting portion of the angular displacement sensor.

Rectangular receiving electrodes 41 and 42 are connected to the + input of a differential amplifier. Rectangular receiving electrodes 46 and 47 are connected to the —input of the differential amplifier. This completes the receiving portion of the angular displacement sensor.

It shall be noted that the width of the slider electrodes 51-54 is selected to be twice the period length in angular direction, that which the rectangular pattern on the axle is repeated. Each 21/26. 31/36, etc electrode is considered as equal elements in determining that periodicity.

When the transducer is in the angular measuring mode, the tapered portion of electrodes 21/26, 31/36, etc. is disabled by feeding conjugant 21/26, 22/27, ...) tapered electrodes with the same signal. Every other of those electrodes are fed with opposite polarity signal, so 21/26 and 22/27 are fed with one signal from the oscillator, while electrodes 31/36 and 32/37 are fed with signal of opposite polarity. The receiving electrodes 41+42 and 46+47 are separately connected to the electronic unit. The collar electrodes placed so their dividing lines are over the 41,46,42,47 electrodes while moving of the collar within the measuring range.

If we now look at the coupling between electrode 41 and electrode 21/26 and electrode 31/36, via collar electrodes 51 and 52, we get the dependence of angular rotation of the collar relative to the axle represented:

The capacitance between electrode-pair 21/26 and the collar electrode 51 is the constant over the angular measuring range. Name it C1. The capacitance between collar electrode 51 and axle electrode 41 will vary with the collar angle proportional to the angle:

$$Ca2 = C2^*a/45$$

a is the rotation angle
C2 is the capacitance at full overlap
45 is the angle for full overlap in this embodiment
The charge transferred to the electronics by applying a voltage V on the 21/26 electrode pair will be $$Q1 = V^*C1^*Ca2/(C1+Ca2)$$

The capacitance between the electrode-pair 31/36 and the collar electrode 52 is also constant and the same as in the above case=C1. The capacitance between collar electrode 52 and axle electrode 41 will vary with the collar angle in opposite direction to the angle:

$$Ca3 = C2^*(1-a/45)$$

the charge transferred to the electronics (charge amplifier input) when a voltage transient V is applied on the electrode-pair 31/36 will be:

$$Q2 = V^*C1^*Ca3/(C1+Ca3)$$

The electronic unit is designed so that these two charges will be subtracted from each other, so we will get a resulting charge into the receiver charge input amplifier of $$Q1-Q2 = V^*(C1^*Ca2/(C1+Ca2)-C1^*Ca3/(C1+Ca3))$$

A further development of the above equations will show that the resulting charge will be $$Qa = Q1-Q2 = V^*C1^*C2^*(2a/45-1)/(C1=C2)$$

which is a linear function of angle a within the measuring range (51/52 dividing line within the angular extension of electrode 41).

Above relations are exactly the same for the charge transferred from electrodes 22/27 and 32/37 to the electrode 42. For the charge transferred to the electrodes 46 and 47 a similar relation holds, only that the polarity is changed relative to the above derivation. But this polarity change is taken care of in the receiver electronics by the inversion of the signals from the 46,47 inputs relative the 41/42 inputs.

From the above explanation it is clear that the angular displacement of the collar relative to the axle is giving variations in the capacitive coupling between transmitter and receiver electrodes, via the collar electrodes, that is indicative of the angular position.

It is also clear that when the electrodes on the axle are connected as indicated, there is no influence from axial movement of the collar, because the effective electrodes have no variation in area with the axial movement.

Additional compensation of either misalignment of slider 2 relative to axle 1 such as might be caused by wear or bearing clearances is also compensated for. This is accomplished by connecting all transmitting electrode in parallel and dividing this signal into the outputs for angular or axial displacements. Any signal that is the result of misalignment is thus divided out.

Figure 3:
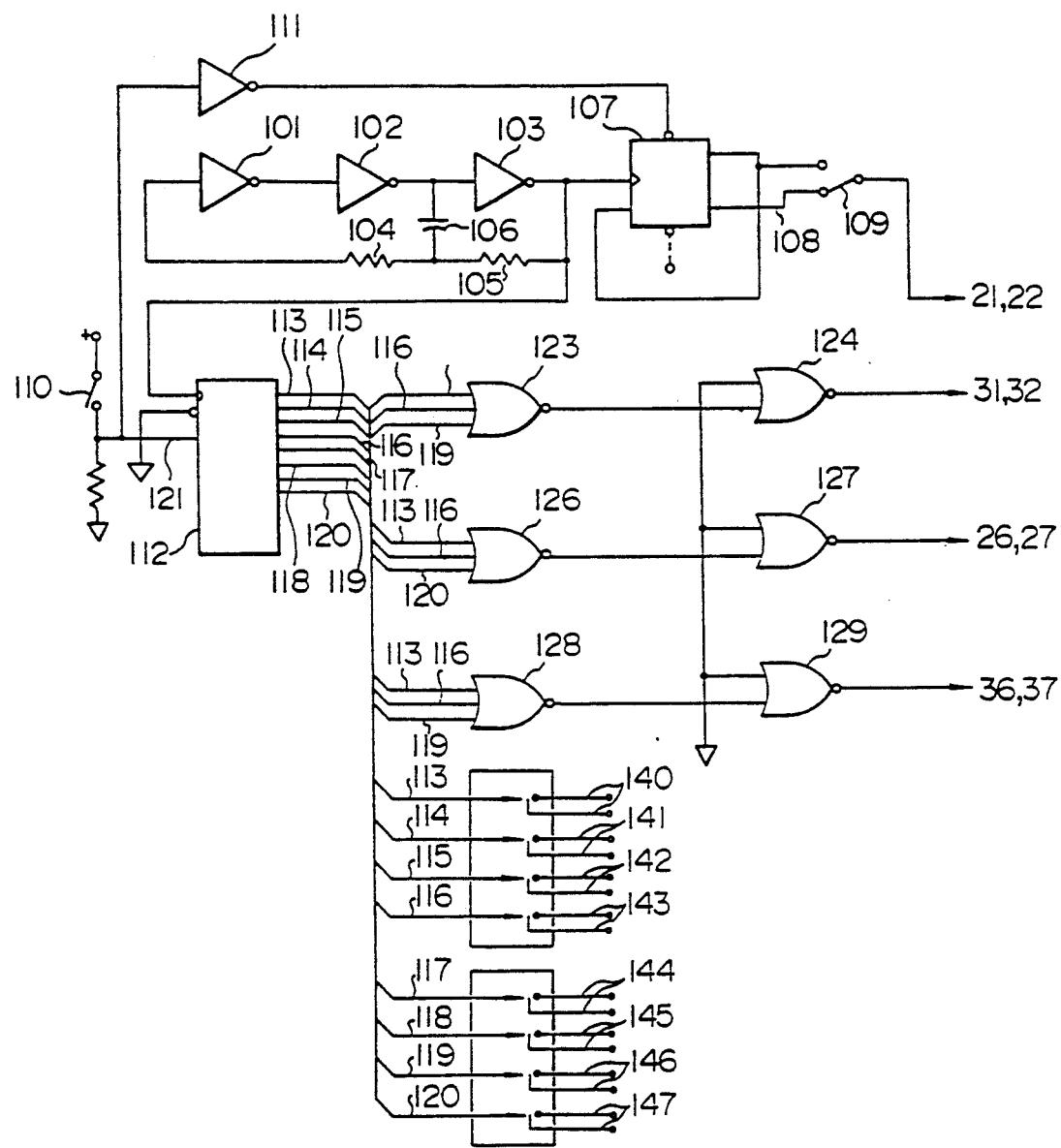
FIG. 3 is a schematic diagram of the transmitter electronic package of the invention.

FIG. 3 is a schematic diagram of the transmitter timing package of the invention. Three operational amplifiers 101,102, and 103 are connected to form an oscillator. The frequency is determined by the values of two resistors 104 and 105 and a capacitor 106. In this embodiment HC 04 operational amplifiers have been shown to be successful when 104 and 105 have values of 33,000 and 39,000 ohms respectively and 106 has a value of 100 pico farads to produce an output frequency of about 25 khz.

The output of the oscillator is conveyed to the input of a flip-flop 107. Flip-flop 107 halves the output of the oscillator and allows timing. Output 108 of flip-flop 107 is applied directly to transmitting electrodes 21 and 22. A HC 74 integrated circuit has been found satisfactory for flip-flop 107. A reset switch 109 is connected to the reset input of flip-flop 107 by way of a buffer amplifier 111. The result is a pulse on electrodes 21 and 22 on every other pulse produced by the oscillator. A phase selection switch 110 is provided to allow selection of phase.

The output of the oscillator also is connected to the input of a decade counter 112. Decade counter is a five stage johnson decade counter with a built in code converter. In this embodiment a MC14017B decade counter made by Motorola has been found suitable although other equivalent counters could be substituted. Counter 112 provides an output at terminal 113 on input of the first pulse terminal 114 on the second and so through terminal 120 on the eight pulse. The reset terminal 121 of counter 112 is further connected to the reset switch 109. When reset switch 109 is closed a voltage is imposed on the reset terminals of both flip-flop 107 and counter 112 ensuring that each of their cycles will begin on the leading edge of the next pulse from the oscillator.

Outputs 114,116 and 119 of counter 112 are connected to the input of a Nor gate 123. The output of Nor gate 123 is connected to the input of an inverter 124. Finally, the output of inverter 124 is connected to electrodes 31 and 32 of the encoder. The result is a pulse on electrodes 31 and 32 on each second, fourth and seventh pulse produced by the oscillator.

Outputs 113,116 and 120 of counter 112 are connected to the input of a second Nor gate 126. The output of Nor gate 126 is connected to the input of an inverter 127. Finally, the output of inverter 127 is connected to electrodes 26 and 27 of the encoder. The result is a pulse on electrodes 26 and 27 on each first, fourth and eighth pulse produced by the oscillator.

Outputs 113,116 and 119 of counter 112 are connected to the input of a third Nor gate 128. The output of Nor gate 128 is connected to the input of an inverter 129. Finally, the output of inverter 129 is connected to electrodes 36 and 37 of the encoder. The result is a pulse on electrodes 36 and 37 on each first, fourth and seventh pulse produced by the oscillator.

Each output of counter 112 is also connected to an analog switch. In this embodiment two DG308A quad Monolithic spst switch manufactured by Siliconix has been found satisfactory. The result is that switch 140 is closed on the first pulse, 141 on the second pulse and so through switch 147 which is closed on the eighth pulse.

Figure 4:
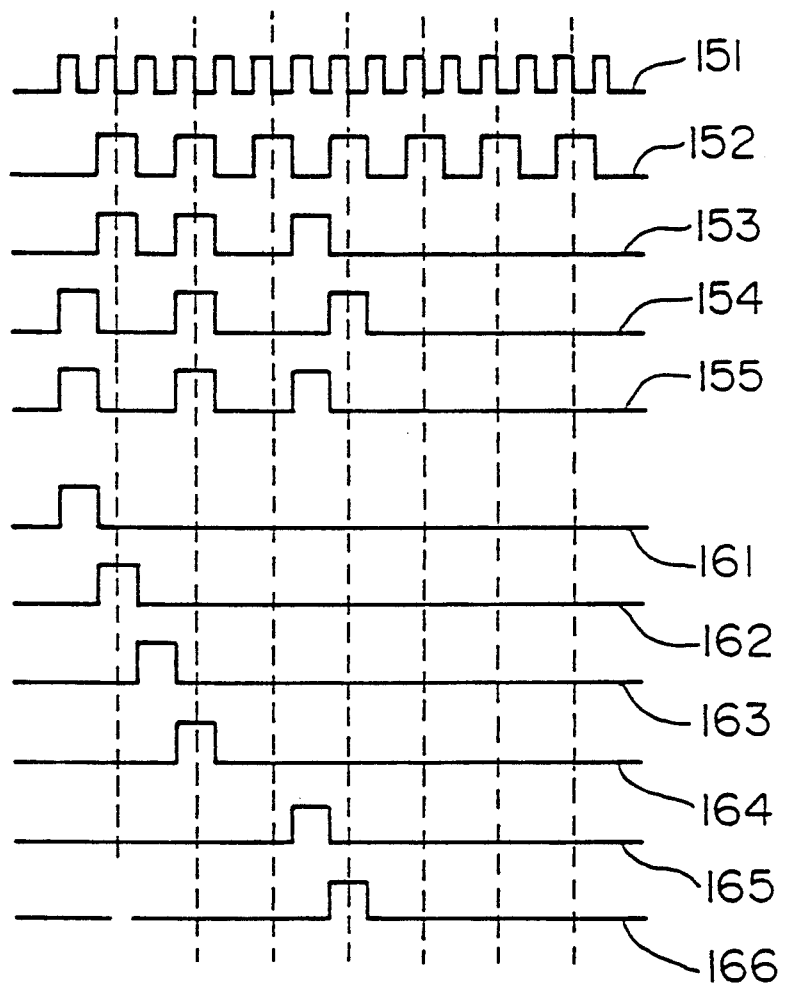
FIG. 4 is a representation of waveforms present in FIG. 3.

FIG. 4 is a series of waveforms which illustrate the timing of the system. The first waveform 151 is the timing pulses of the oscillator. Next is the output 152 of flip-flop 107 which is applied to transmitting electrodes 21 and 22 which produces a pulse on every other oscillator pulse. Third, is the output 153 of inverter 124 which is applied to transmitter electrodes 31 and 32. This output is a pulse on each second, fourth, and seventh oscillator pulse. Fourth, is the output 154 of invertor 127 which is applied to transmitter electrodes 26 and 27. This output is a pulse on each first, fourth, and eight oscillator pulse. Fifth, is the output 155 of invertor 129 which is applied to transmitter electrodes 36 and 37. This output is a pulse on each first, fourth and seventh oscillator pulse.

Waveforms 161-166 are the periods during which switches 140-147 are closed. For example switch 140 is closed 161 during the period during which transmitting electrodes 26,27,36 and 37 are receiving signals. Similarly, switch 141 is closed 162 during the period in which transmitting electrodes 21,22,31 and 32 are receiving signals. These two switches 140,141 are thus closed when the encoder is configured to measure longitudinal displacements.

Switch 143 is closed 163 during the ground state at which time no transmitting electrode is receiving signals. Switch 144 is closed 164 during a period where all transmitting electrodes are receiving a signal. These two switches 143 and 144 are used to produce a correction signal.

Switch 145 is closed during the period 165 when transmitting electrodes 31,32,36 and 37 are receiving a signal. Finally, switch 146 is closed during the period 166 when transmitting electrodes 21,22,26 and 27 are receiving a signal. These two switches are thus closed when the encoder is configured to produce a angular displacement signal.

Figure 5:
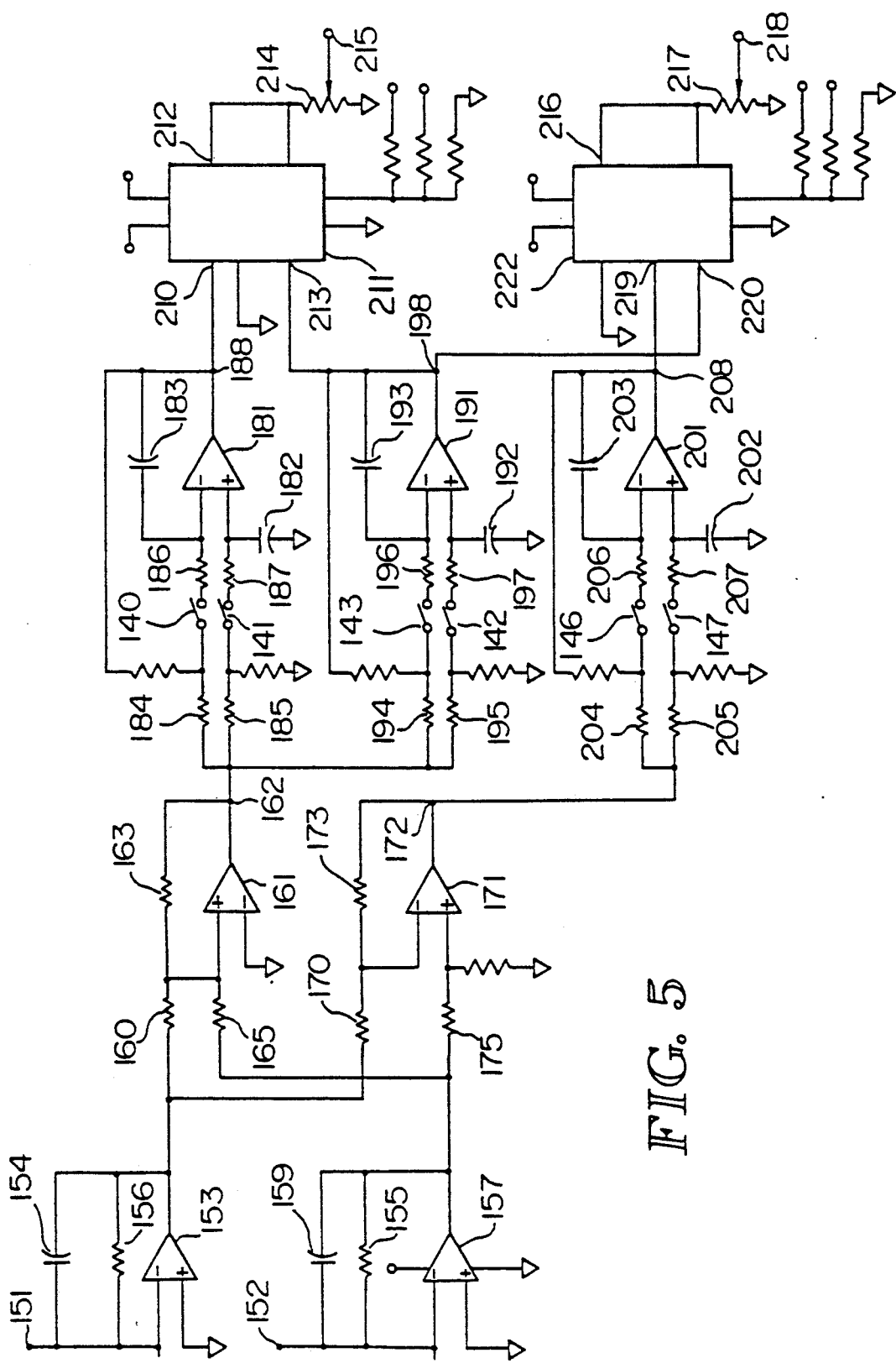
FIG. 5 is a schematic diagram of the receiver electronic package of the invention.

FIG. 5 is a schematic diagram of the receiver of the invention. One input 151 is connected to the receiving electrodes 41, and 42 similarly receiving electrodes 46 and 47 are connected to input 152. Each input is connected to a charge amplifier. For example the charge amplifier connected to input 151 includes an operational amplifier 153 a capacitor 154 and a resistor 156. Operational amplifier 153 has one input connected to ground. A charge amplifier provides an output that is proportional to the ratio of the capacitance at input 151 and capacitor 154. In this embodiment a 347 operational amplifier has been found to be satisfactory when capacitor 154 is 20pf. A similar charge amplifier including an operational amplifier 157, capacitor 159 and resistance 155 is connected to input 152.

The outputs of the charge amplifiers are connected by way of 10k ohm resistors 160 and 165 to the + input of another operational amplifier 161. The − input is grounded. Amplifier 161 thus produces a signal at output 162 that is the sum of the signals outputed from amplifiers 153 and 157. A resistance 163 provides stability when selected to provide negative feedback. 10 K ohms has been found satisfactory for 163.

The outputs of one charge amplifier is connected by way of 10k ohm resistor 170 to the − input of another operational amplifier 171. The + input is connected by way of resistor 175 to the other charge amplifier. Amplifier 171 thus produces a signal at output 172 that is the difference of the signals outputed by amplifiers 153 and 157. A resistance 173 provides stability. 10 K ohms has been found satisfactory for 173.

There are three demodulator sections in the receiver: consisting of the operational amplifiers 181, 191, 201 and surrounding components. The configurations of each section are identical. Two of the demodulators operate on the sum signal at terminal 162. The other demodulator operates on the difference signal at terminal 172.

The first demodulator includes an operational amplifier 181. Two integration capacitances 182 and 183 are connected to its inputs. Resistances 184,185,186 and 187 aid in isolating signals. Values of 22k ohms for 184 and 185 and 10k ohms for 186 and 187 have been found effective with use of a 347 operational amplifier. Switch 141 is connected in series with the + input of operational amplifier 181 and switch 140 is connected in series with the − input. As a result the first demodulator produces a negatively integrated signal at output 188 when a signal is applied to transmitting electrodes 26,27,36 and 37 when switch 140 is closed and a positively integrated signal at output 188 when a signal is applied to electrodes 21,22,31 and 32 when switch 141 is closed. The output at terminal 188 is thus the average of the signal transferred through plates 21+22+31+32 to plates 41+42−46−47 via the plates 51+52+53+54 on the collar, which signal is proportional to the transverse displacement of collar 2 on axle 1.

The second demodulator includes an operational amplifier 191. Two integration capacitances 192 and 193 are connected to its inputs. Resistances 194,195,196 and 197 aid in isolating signals and stabilizing DC levels. Values of 22k ohms for 194 and 195 and 10k ohms for 196 and 197 have been found effective with use of a 347 operational amplifier. Switch 142 is connected in series with the + input of operational amplifier 191 and switch 143 is connected in series with the − input. As a result the second demodulator produces a negatively integrated signal at output 198 when a signal is applied to all transmitting electrodes 21,22,31,32,26,27,36 and 37 when switch 143 is closed. When switch 142 is closed, the second demodulator produces a positive integrated output of the voltage out form 162, for the case of no signals connected to the transmitting plates, which serves to balance the output for existing DC signals in the preceding electronic circuits. The sum output at terminal 198 is thus representing the signal amplitude from the sensor, independent of the axial and angular movement. This signal is used to normalize the signals for angular and axial measurement and thereby make the measurements independent on variations of the input signal amplitude and variations of the gap between the plates on the axle and the plates on the collar.

The third demodulator includes an operational amplifier 201. Two integration capacitances 202 and 203 are connected to its inputs. Resistances 204,205,206 and 207 aid in isolating signals and stabilizing DC levels. Values of 22k ohms for 204 and 205 and 10k ohms for 206 and 207 have been found effective with use of a 347 operational amplifier. Switch 147 is connected in series with the +input of operational amplifier 201 and switch 146 is connected in series with the −input. As a result the third demodulator produces a negatively integrated signal at output 208 when a signal is applied to transmitting electrodes 31,32,36 and 37 when switch 146 is closed and then a positively integrated signal when a signal is applied to electrodes 21,22,26 and 27 when switch 147 is closed. The output at terminal 208 is thus proportional to the angular displacement of slider 2 on axle 1.

The result of the demodulation process is a longitudinal signal at point 188 and an angular signal at point 208 and finally, a correction signal at point 198. The longitudinal and angular signals must be divided by the correction signal to produce a corrected output. This is accomplished by use of two divider circuits. In this embodiment two internally trimmed integrated circuit dividers 211 and 222 were used. A circuit manufactured by Analog Devices under the part number AD535 has been found successful in this embodiment. The longitudinal signal at 188 is connected to the numerator input 210 of 211 and the correction signal at 198 to the denominator input 213. The product output 212 is connected to a trimmer potentiometer 214 and the output 215. Similarly, the angular signal at 208 is applied to the nominator input 219 of divider 212 and the correction signal at 198 to the denominator input 220. The product output 216 is in turn connected through a trimmer potentiometer 217 to output 218.

The signal at output 215 is a DC voltage which is proportional to the longitudinal displacement of slider 2 on axle 1. The signal at output 218 is also a DC voltage which is proportional to the angular displacement of slider 2 on axle 1. A variety of output devices may be connected to outputs 215 and 216 including but not limited to meters, oscilloscopes and a analog to digital converter if digital readout is desired.

Figure 6:
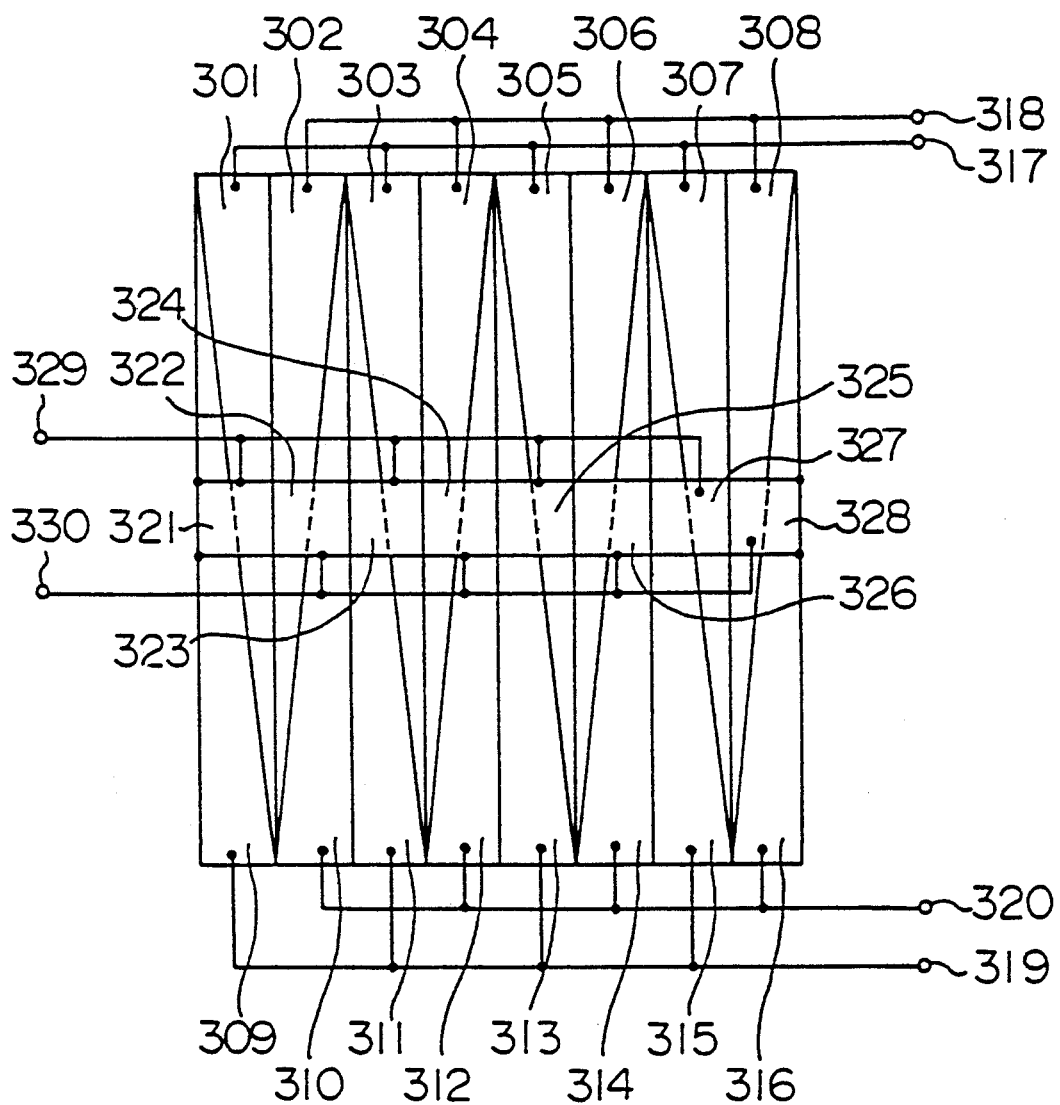
FIG. 6 is a plan view of the unwrapped electrodes of a second embodiment of the invention.

FIG. 6 is a plan view of the encoder electrodes of a second embodiment of the invention. In this embodiment connections are required both to the collar and the axle. This embodiment has the advantage that the signal is stronger than that of the FIG. 2 embodiment as there is only one capacitance in series for each transmission path. The device is shown unrolled for clarity but in practice would be used as shown in FIG. 1. In this embodiment there are 16 transmitting electrodes 300-316. Each transmitting electrode is triangular in shape as shown. Electrodes 301,303,305 and 307 are connected together to form group 317. Electrodes 302,304,306 and 308 are connected together to form group 318. Electrodes 309,311,313 and 315 are connected together to form group 319. Electrodes 310,312,314 and 316 are connected together to form group 320. This completes the transmitting electrodes.

There are 8 receiving electrodes 321-328 connected to collar 2. Each receiving electrode is rectangular. Electrodes 321,323,325 and 327 are connected to form group 329. Similarly, electrodes 322,324,326 and 328 are connected together to form group 330.

To measure axial displacements an alternating current signal having the value of cos wt is placed on the electrodes in groups 317 and 318. A second signal having the value of sin wt that is 90 degrees out of phase with the first signal is placed on the electrodes in groups 319 and 320. The sum of the signals received on the electrodes in groups 329 and 330 will follow the equation $X \cos wt + j(1-x) \sin wt$ where x is the axial displacement w is the angular velocity and t is time. This signal may easily be decoded by conventional electronic circuitry to isolate x.

The resulting signal will have a phase angle relative to the transmitted signals, that is $$alfa = arctg(x/(1-x))$$

This phase angle is easily detected by conventional electronic circuitry. Alfa is proportional to x within <5%. The deviation from linearity is predictable and can easily be corrected in conventional electronic circuitry.

To measure angular displacements an alternating current signal having the value of cos wt is placed on the electrodes in groups 318 and 320. A second signal having the value of sin wt that is 90 degrees out of phase with the first signal is placed on the electrodes in groups 319 and 317. The difference of the signals received on the electrodes in groups 329 and 330 will follow the equation (1+(angle/45)) cos wt−j(angle/45) sin wt where x is the axial displacement w is the angular velocity and t is time. This signal may easily be decoded by conventional electronic circuitry to isolate the angle.

The resulting signal will have a phase angle relative to the transmitted signals, that is $$alfa = arctg(x/(1-x))$$

This phase angle is easily detected by conventional electronic circuitry. Alfa is proportional to x within <5%. The deviation from linearity is predictable and can easily be corrected in conventional electronic circuitry.

The above signals may be multiplexed in the manner illustrated in the description of FIGS. 4 and 5 to allow nearly simultaneous measurement of both the axial and angular displacement.

FIGS. 7 to FIG. 16 illustrate a third embodiment of the invention, suited for measurement over extended range both in the linear and angular direction. Actually, with this embodiment, the linear measurement can be extended over any desired measurement range, with retained ability to resolve the finest increment of measurement. The angular range can be extended to the full 360 degree rotation of the hub, or even with counting of the revolutions, function over several revolutions. Provisions are also made for getting an absolute indication of position in both directions, in spite of the primary measurements being basically incremental in counting measurement periods as will be further explained hereinbelow.

Figure 7:
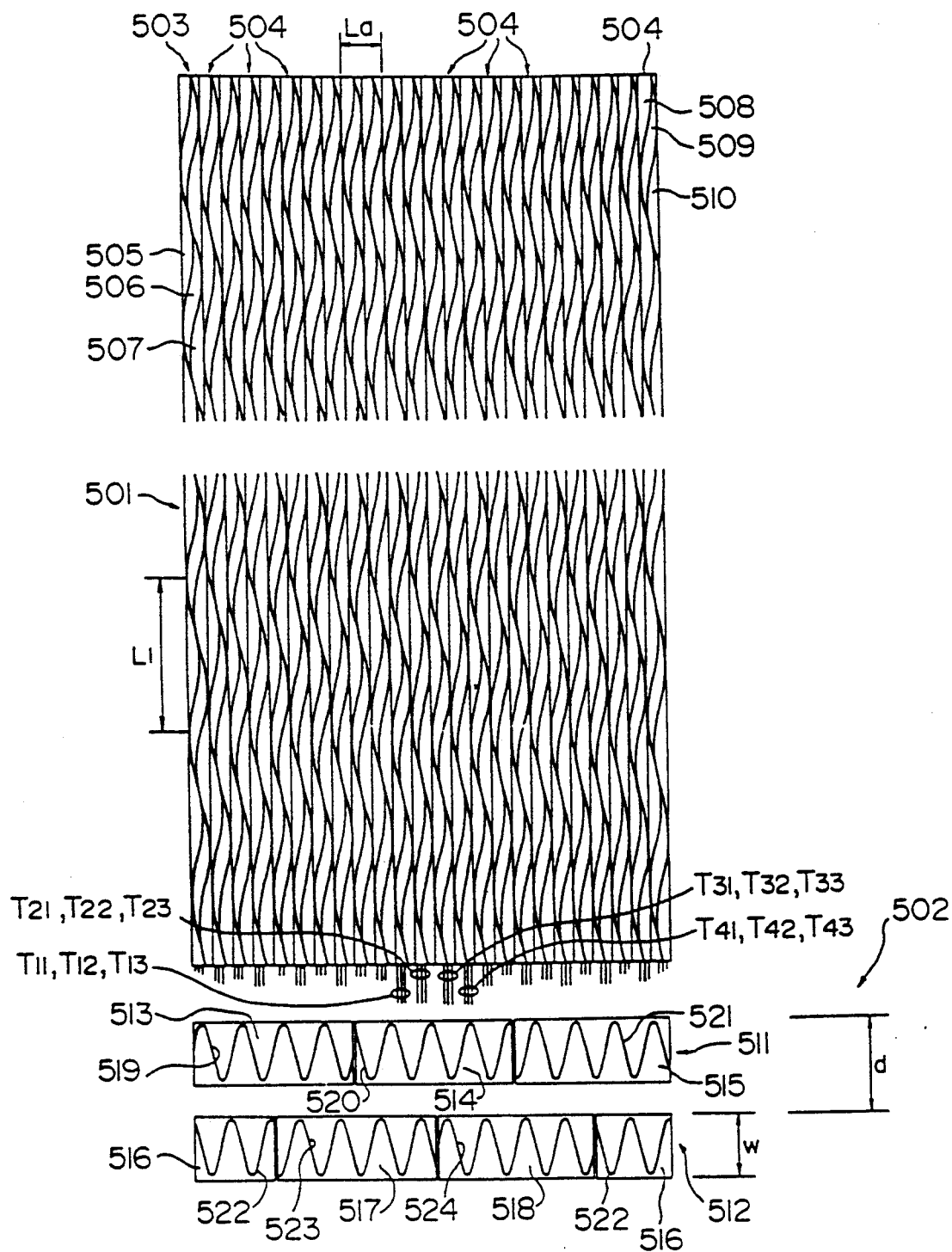
FIG. 7 is a plan view of the unfolded electrode pattern of a third embodiment of the invention.

FIG. 7 is a plan view of the unfolded electrode pattern for this embodiment wherein 501 is the wrapped-out pattern for attachment to axle 1, and 502 is the wrapped-out pattern for attachment to collar 2. Axle pattern 501 includes a number of longitudinal sections 503 and 504, where each section has a constant tangential width and is extended along axle 1 on the surface of the axle. Sections 503 and 504 are alternating so every second section is of the same kind. Each section 503 is internally divided into three fields 505, 506, 507, in a way that forms a periodic pattern along the axle. Each field has an extension in tangential direction, that follows a sinusoidal function, with the three sections being phaseshifted relative to each other by 360/3 degrees. With L1 as the wavelength of the pattern within the sections 503, the functions can be expressed with following formulas:

$$A(505) = A + B*\sin(2*\pi*x/L1)$$

$$A(506) = A + B*\sin(2*\pi*x/L1 - 2*\pi/3)$$

$$A(507) = A + B*\sin(2*\pi*x/L1 + 2*\pi/3)$$

The dividing lines between subsections follow the following expressions:

$$P1(x) = K$$

$$P2(x) = K + A(505)$$

$$P3(x) = K + A(505) + A(506)$$

$$P4(x) = K + A(505) + A(506) + A(507) = K + 3*A$$

The value of the constant B is chosen to be a little less than A, enough for A-B to form a continuous conducting path for each subsection 505, 506, 507 along the pattern through the narrow portions. This path is not visible in FIG. 7 due to scale limitations, but is apparent from above formulas, if for example B=A*0.9. Also, there is an insulation space between the subsections and the sections, which has not been included in above formulas. The effect of the insulation is trivial, not affecting the principle of this explanation.

Section 504 having subsections 508-510 is similar to sections 503 (505-507, but with a different wavelength L2. So the formulas for the subsections 508, 509, 510 will be:

$$A(508) = A + B*\sin(2*\pi*x/L2)$$

$$A(509) = A + B*\sin(2*\pi*x/L2 - 2*\pi/3)$$

$$A(510) = A + B*\sin(2*\pi*x/L2 + 2*\pi/3)$$

The wavelength L2 is related to L1 by the following formulas:

$$L2*N2 = L1*N1 = Lc$$

$$N2 = N1 + 1 (or\ N2 = N1 - 1)$$

Lc is the range over which absolute measurements can be made in the x direction, further to be explained later on in the description of this embodiment.

The distance La, over which the pattern of sections 503 and 504 becomes periodic in the tangential direction, is the wavelength for fine angular measurement. Furthermore, the connections to the electronics from the electrodes on the axle are done in two groups (T11, T12, T13, T21, T22, T23) and (T31, T32, T33, T41, T42, T43), so the electrodes can be fed in a manner that constitutes one period of signals over the full 360 degree circumference of the axle.

The pattern of electrodes for attachment to collar 2 includes two rings of electrodes 511 and 512. Ring 511 is divided into three sections 513, 514, 515. Ring 512 is also divided into three sections 516, 517, 518. Each section is in turn divided into two parts by a sinusoidal shaped insulation space 519-524. The insulation spaces are chosen to have a wavelength equal to the axle tangential wavelength La, expressed as an angle. The three sections on each ring 511 and 512 have their sinusoidal functions phaseshifted by 360/3 degrees, and between the two rings, the sections are offset by 180 degrees. The resulting electrode pattern on the collar thus contains 6 phases for Fine angular measurement, by utilizing the electrodes in the La wavelength pattern, and 6 phases for Coarse angular measurement by combining the electrodes in the 2*3 sections of the electrode rings. Furthermore, the two rings have a width and distance between them, that is adapted to the axial wavelength L1 and L2 on the axle pattern, so they can function as receiver for that wavelength. The width w is preferably not more than half of L1 or L2 and the distance d between the rings is preferable an odd multiple of (L1+L2)/4. A practical dimensioning makes the width less than half of the mean value of L1 and L2, so the two rings can be placed at half the mean value of L1 and L2.

The connection of each of the electrodes 513-518 to the electronic unit is done with each of the electrodes on the collar brought out as a separate connection as on the axle pattern. The electrodes are given names for this description as follows:

The first ring 511,
    first section 513=R12, R15
    second section 514=R16, R13
    third section 515=R14, R11
The second ring 512,
    first section 516=R26, R23
    second section 517=R24, R21
    third section 518=R22, R25

Note that the second ring 512 has its sections offset relative to the first ring 511, so the numeration first, second, ... section is not quite corresponding.

On axle 1, the three electrodes 505-507 in each 503 section are connected to the corresponding electrodes in the other 503 sections over half of the circumference of the axle, making three connections T11, T12, T13 to the electronics. The remaining 503 sections are connected similarly forming three connections T31, T32, T33. The 504 sections are connected in a corresponding way making the terminals T21, T22, T23 from the first half of the axle circumference and T41, T42, T43 from the second half of the axle circumference.

Figure 8:
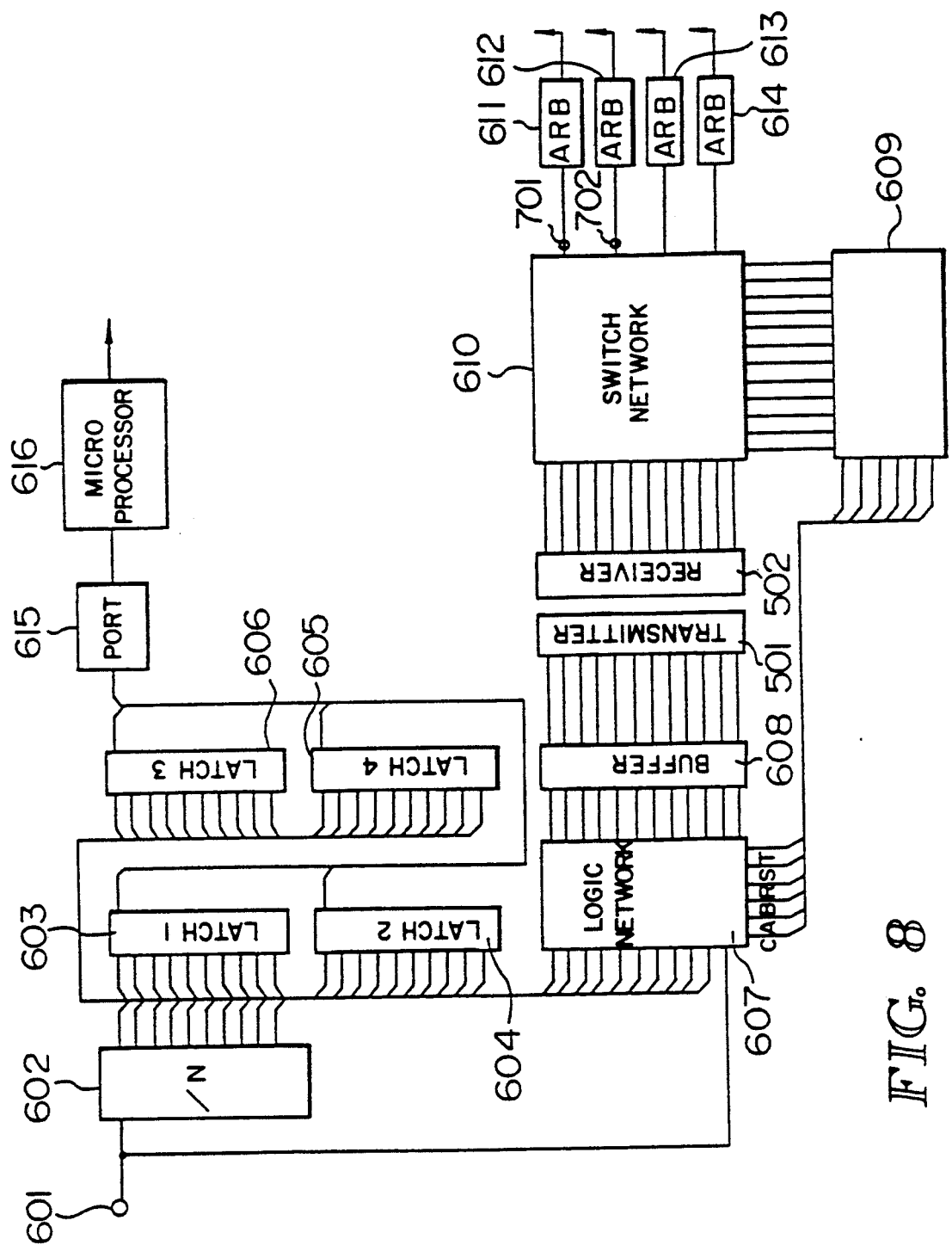
FIG. 8 is a block diagram of the electronic package for the FIG. 7 embodiment.

FIG. 8 is a block diagram of the electronic unit for the FIG. 7 embodiment. In the electronic unit, FIG. 8, the terminals to the transducer are connected in several combinations through multiplexing, for achieving information about the relative position between axle and collar in both axial and angular direction, both Fine and Coarse measurement in both directions.

Figure 9:
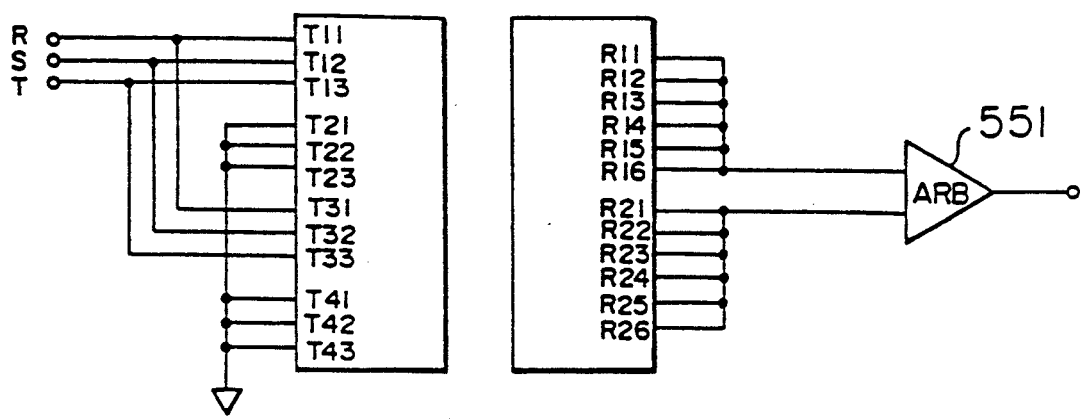
FIG. 9 is the electrode configuration of the FIG. 7 embodiment for axial measurement.

FIGS. 9 to 12 illustrate the four different modes of connection of electrodes to the electronics package. FIG. 9 shows the connection for axial measurement using the L1 wavelength scales. The terminals T11, T12, and T13 are parallel connected to terminals T31, T32, and T33 in numerical order, and the resulting three input terminals are connected to a three-phase output signal R,S,T in the electronics. The collar electrodes are connected with all electrodes from the first ring together, resulting in a ring-shaped electrode, the signal of which is connected to the negative terminal of the Analogue Receiving Block (ARB)551. The terminals from the second ring are similarly connected together to form a second ring electrode, the signal of which is connected to the positive terminal of the ARB 551.

Figure 10:
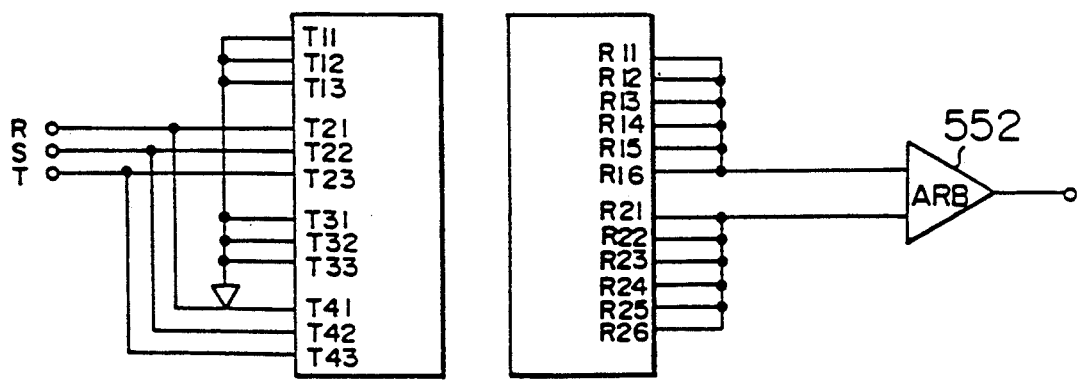
FIG. 10 is the electrode configuration of the FIG. 7 embodiment for axial measurement on a different scale.

FIG. 10 illustrates the connection for axial measurement using the L2 wavelength scales. The terminals T21, T22, and T23 are parallel connected to terminals T41, T42, and T43 in numerical order, and the resulting three input terminals are connected to a three-phase output signal in the electronics. The collar electrodes are connected in the same manner as illustrated in FIG. 9 when measuring with wavelength L1.

The measurement with wavelength L1 gives the position within the Fine wavelength L1. The measurement with the wavelength L2 gives the same type of information, but because of the wavelength difference, there is a difference between these two measurements, proportional to the number of L1 (L2) wavelengths that the collar is displaced from the zero point along the axle. The information about Coarse position within the Coarse range Lc is obtained by subtracting the measurement value at L1 measurement from the measurement value at L2 measurement.

$$Xc = (x1 - x2) \cdot Lc/L1$$

Where Xc represents the coarse position, x1 and x2 represent the Fine position within a L1 wavelength, x2 the Fine position within a L2 wavelength.

Figure 11:
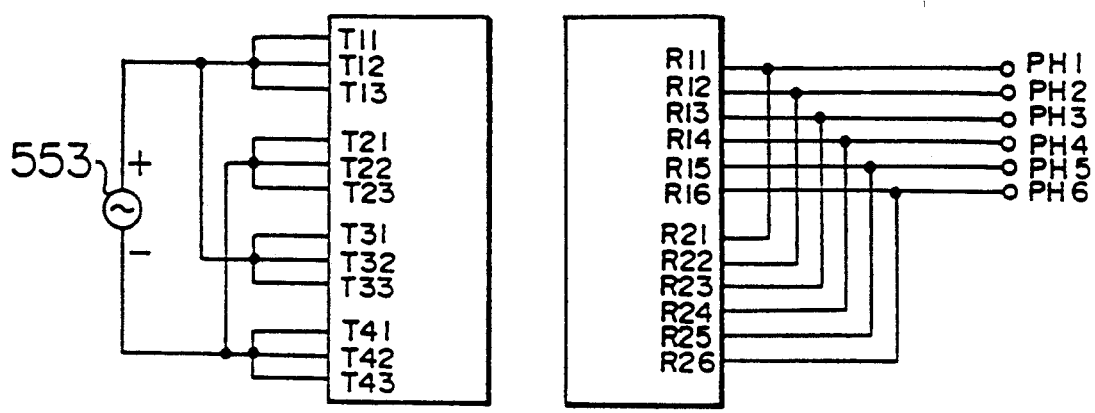
FIG. 11 is the electrode configuration of the FIG. 7 embodiment for fine angular measurement.

FIG. 11 illustrates the connections for angular Fine measurement. The axle pattern is connected with sections 503 connected to the positive side of the signal generator 553, sections 504 connected to the negative side of the signal generator 553. Thereby a periodic field pattern is formed in the angular direction with angular wavelength La. This pattern is sensed by the collar electrodes by having the electrodes connected in a manner that constitutes a six-phase sensor with an effective wavelength equal to the axle angular wavelength La. Thus electrode terminal R11 is parallel with terminal R21 giving the first phase, electrode terminal R12 is parallel with terminal R22 giving the second phase and so on. By scanning over the six phases by a switch network, the receiver receives a signal, the envelope of which has a phase position that is proportional to the angular position of the collar relative to the axle within the angular wavelength La. The position within this wavelength can this way be measured to within a fraction of the wavelength, practically to within 1/100 to 1/1000 of the wavelength, limited by the accuracy of the pattern and the dimensioning of the electronic circuit.

Figure 12:
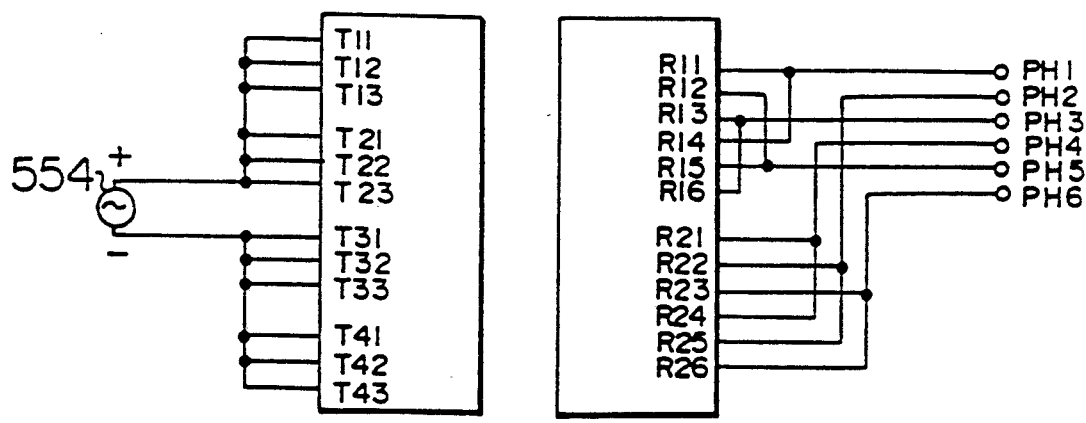
FIG. 12 is the electrode configuration of the FIG. 7 embodiment for coarse angular measurement.

FIG. 12 illustrates the connections for the angular Coarse measurement. Here, the axle electrodes are grouped with all electrodes on one half of the circumference (T11, T12, T13, T21, T22, T23) connected to one side of the transmitter signal 554, the electrodes on the other half of axle 1 (T31, T32, T33, T41, T42, T43) connected to the other polarity of transmitter signal 554. On the receiver side (the collar), the connections are grouped for making a six-phase receiver with a wavelength equal to 360 degrees of the axle circumference. Thus electrode terminals R11 and R14 are connected together for forming the first receiver phase, electrode terminals R22 and R25 are connected together for forming the second receiver phase, electrode terminals R13 and R16 ... third receiver phase, and so on according to FIG. 12.

Returning to FIG. 8 the block diagram for the total electronic system for achieving above functions in a multiplexed fashion. The oscillator 601 is providing clock signals for the whole thing, as well as modulation signals for the transmitter. The clock signal is in unit 602 divided by a factor N, which in this embodiment is 96, but can be of higher value for higher resolution of the interpolation within the respective wavelengths. The outputs from the divider 602 are combined in the logical network 607 for giving transmitter signals T11, T12, T13, T21, T22, T23, T31, T32, T33, T41, T42, T43 to the electrode groups on the axle. Those signals are amplified in the buffers 608 for driving the transducer with low impedance signals. The logical network 607 also provides input signals A, B, CLOCK, R, S, T, to the switch controller 609. The switch network 610 combines the output terminals from the receiver electrodes 513-518 (the collar) for the four measuring modes in a multiplexing fashion in sync with the corresponding multiplexing on the transmitter side. Both the transmitter multiplexing and the receiver multiplexing will be further described in connection with the timing diagram of FIG. 15 and the detailed diagram of the switch network of FIG. 13.

From switch network 610 we get four outputs, connected to four identical Analogue Receiving Blocks (ARB)611-614, one for each of the four functional modes of the sensor: ARB(611) for Fine1, ARB(612) for Fine2, ARB(613) for AngularFine, and ARB(614) for AngularCoarse. The outputs from these blocks (611-614) are square waves of the same frequency as the signals R,S,T (at zero moving speed), and the phase position of each of those square waves is essentially proportional to the mechanical position of collar 2 relative to the electrode pattern on axle 1 within the actual wavelength for each of the measuring modes. Thus, by connecting the 611 output to the triggering input of Latch1 603, we will from this latch get a reading of the output from the frequency divider 602, that is a digital representation of the axial position within the wavelength L1. Similarly, Latch2 604 will give a digital representation of the axial position within the wavelength L2, Latch3 606 will give a digital representation of angular position within a Fine angular wavelength La, and Latch4 605 will give a digital representation of the coarse angular position within 360 degrees.

The outputs from the four latches 603-606 is read from the microprocessor 616 via the port 615 616 is programmed by conventional means to calculate the actual absolute position and transform them to a suitable form to be received by external equipment. The methods for reading the data from the latches and combining them and converting them to the desired output format are well known by electrical engineers, familiar with microprocessors and their programming.

For example to obtain the axial measurement the microprocessor first reads D1 from latch1 and reads D2 from latch2. Next the microprocessor calculates x(coarse) position in fine increments by use of the following equation:

$$Nc = (D2 - D1) * N1$$

The microprocessor now knows the position within one N1 interval. To make the accurate absolute x position in fine increments the following equation is solved by iteration:

$$nF = N*Dm + D1$$

by selecting N(=integer) so $|nF - nC| < dm*3/8$ giving the axial position value out:

$$x = nf*l1/dm.$$

Similarly, to obtain angular measurement the microprocessor first reads D3 from latch3 and reads D4 from latch4. Next the microprocessor calculates angular(coarse) position in fine increments by use of the following equation:

$$Ac = D4 + K$$

The microprocessor now knows the position within one interval. To make the accurate absolute angular position in fine increments the following equation is solved by iteration:

$$Af = Na*Dm + D3$$

by selecting Na(=integer) so $|Af - Ac| < dm*3/8$ giving the angular axial position in degrees value out:

$$A = Af*360/dm + K$$

The microprocessor then ends the process.

Figure 15:
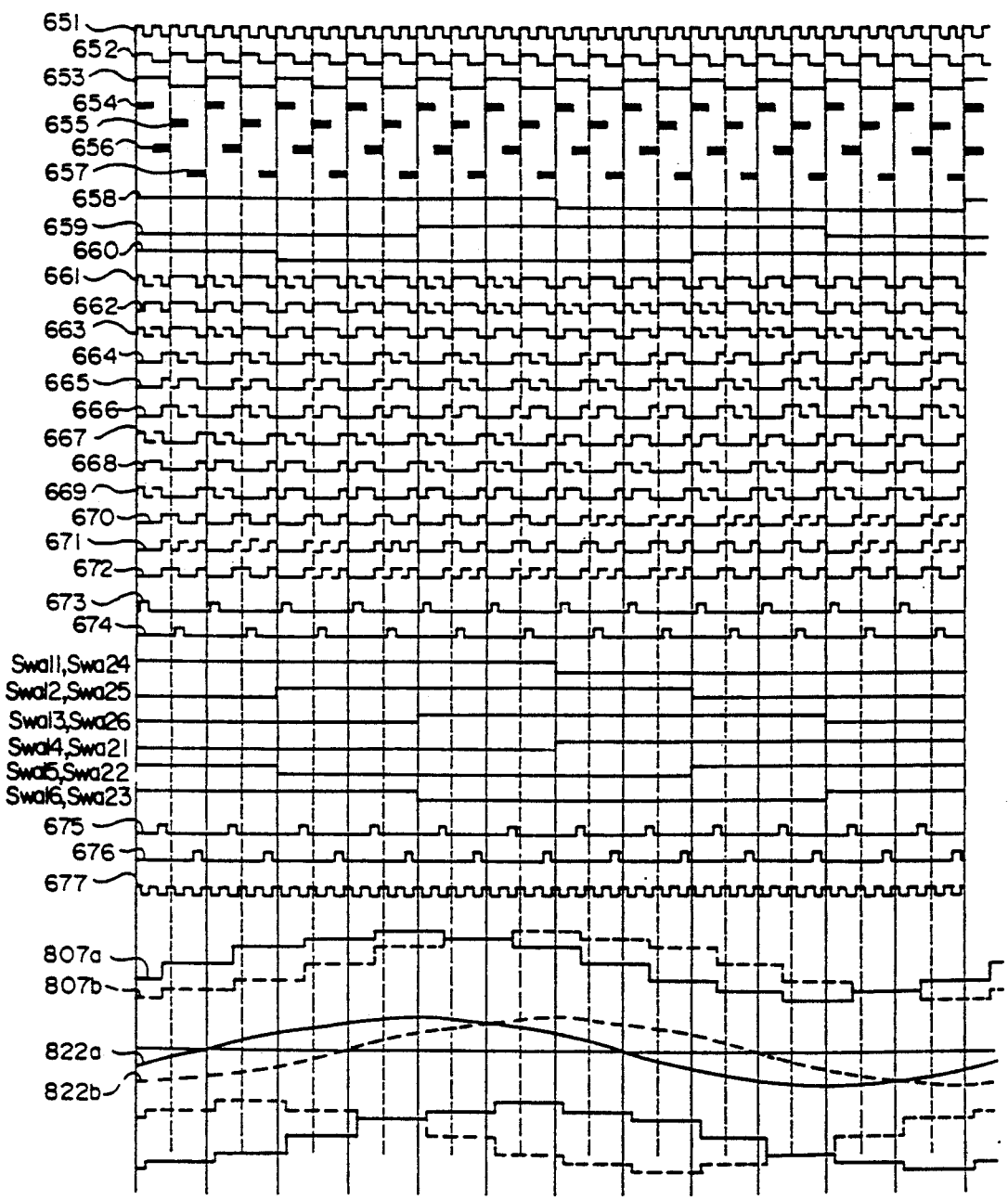
FIG. 15 is a timing diagram illustrating the waveforms present in FIG. 8.

FIG. 15 illustrates a number of important waveforms in the system according to FIG. 8. The "clock" 651 signal is produced by oscillator 601. Signals A 652 and B 653 are the first steps in binary dividing the clock signal to lower frequencies. By logical combination as illustrated in the description of the FIG. 3 embodiment of signals A 652 and B 653 the multiplexing sequence "xFine1 654, xFine2 655, aFine 656, and a Coarse 657" can be defined. The lines 654-657 with those four names in the timing diagram indicate with the horizontal bars the time intervals that are assigned for respective function.

The signals R 658, S 659, and T 660 are the modulation signals for the three phases to the transmitter in the axial measuring mode, as well as the "scanning" signals for the receiver in the angular measuring mode. The signals to the transmitter electrodes T11 661, T12 662, T13 663, T21 664, T22 665, T23 666, T31 667, T32 668, T33 669, T41 670, T42 671, and T43 672 are assigned the same names in the timing diagram. As the transducer is capacitive, the information transfer occurs only in the voltage transitions. Therefore, in the design of this system we can concentrate our attention on the voltage transients in the signals.

The receiver switching is designed for letting through the transients that are coincident with the negative flanks of the clock signal (see Swx1 673, Swx2 674, SwaF 675, SwaC 676), while the positive flank is grounded (SwG 677). Therefore only the part of the transmitter signals that are coincident with the negative flanks of the clock signal are of interest in designing the waveforms for the transmitters. With this in mind it is easy to see that the effect of the transmitter waveforms according to T11, T12, T13, T21, T22, T23, T31, T32, T33, T41, T42, T43 diagrams in FIG. 115 will be that the transmitter electrodes are multiplexed between the configurations according to FIGS. 9 through 12.

Figure 13:
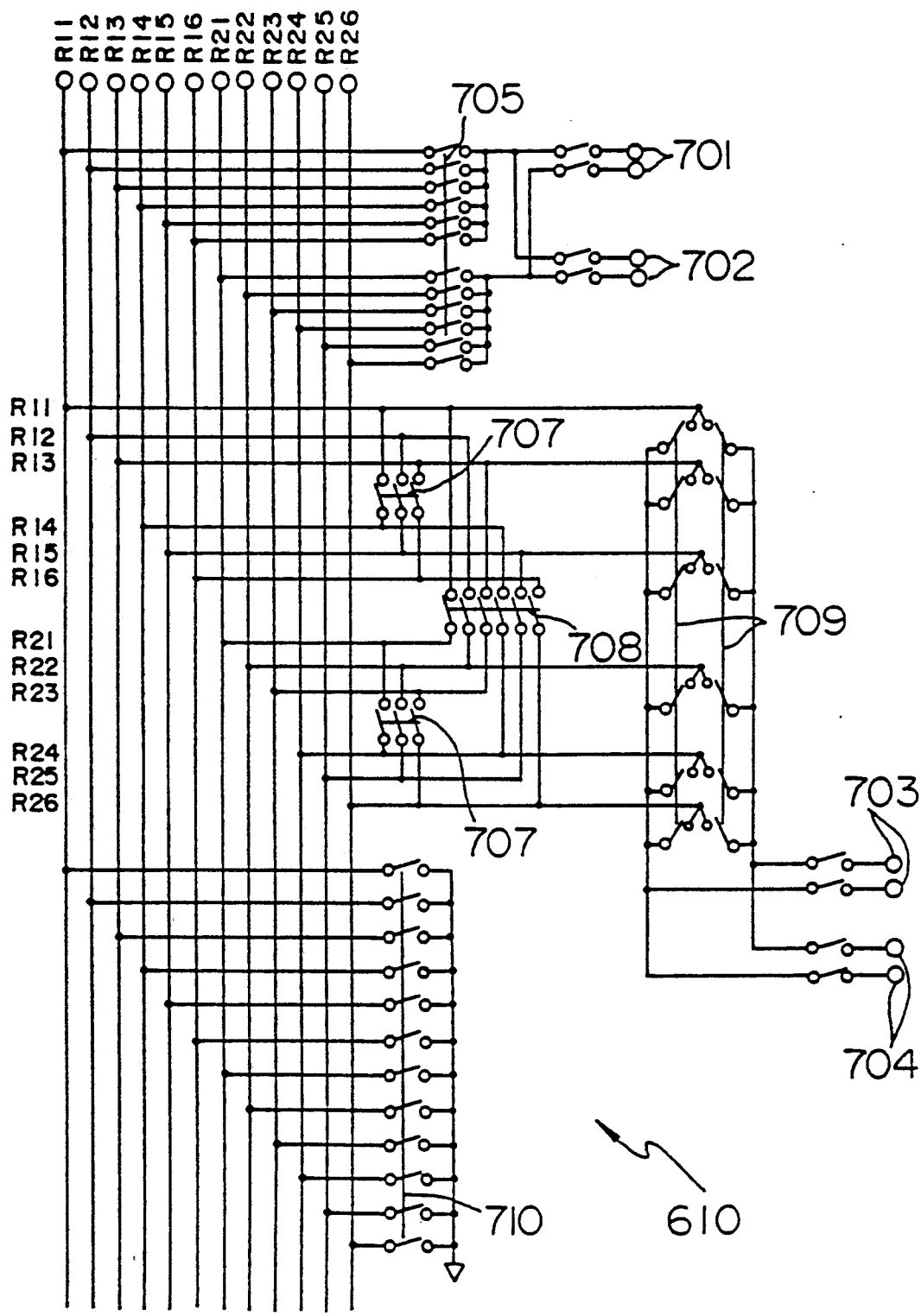
FIG. 13 is a detail of the switch network of FIG. 8.

FIG. 13 is a detailed diagram of the Switch Network 610 from FIG. 8. All the switch symbols represent CMOS switches, which can easily be integrated into a custom IC chip, whereby the great number of switches will not cause any problem for signal load or required space. In the intervals, when signal A is high the switches 705 are closed and the axial measurements are done. Switches 701 are activated during the Fine1 mode, with a closed interval that surrounds the negative transmission time of the clock signal. For safe functioning, this gate signal is created with a clock signal that is slightly offset relative to the original clock signal. This is easily done with a simple time delay network, familiar to an electrical engineer, skilled in the art of design of digital circuits.

Switches 702 are activated in the Fine2 mode and their gate signals Swx2 are designed to surround the negative transmission of the clock signal the same way as the 701 gate signal. This characteristic of surrounding the corresponding edge of the clock signal is also valid for the angular gate signals SwaF and SwaC (negative clock transmission) as well as the grounding clock signal SwG (positive clock transmissions).

The outputs 701 are two wires, in the block diagram represented by one wire. The same comments holds for each of the outputs 702, 703 and 704. Those two wires represent differential inputs to the Analogue Receiving Blocks 611, 612, 613, 614 respectively, as will be more apparent from FIG. 14, which is a detailed representation of a solution for those blocks.

In the angular measuring modes, the switches 707 and 708 make the appropriate interconnections between receiving electrodes for angularCoarse and angularFine modes respectively. Thus six receiving phases PH1 . . . PH6 are created, and they are scanned by switches 709 for forming differential output signals for terminal pairs 703 and 704 for the angularFine resp angularCoarse measurements. The 707 switches are closed during the aCoarse intervals according to the timing diagram, and the 708 switches are closed during the aFine intervals. The SwaF and SwaC switches are closed around the appropriate negative clock transmissions intervals according to the timing diagram and we get the desired demodulation of the receiver signals into the appropriate ARB:s.

Surrounding the positive transmission intervals of the clock signal, the switches 710 are closed, controlled by the signal SwG as seen in the timing diagram. This will connect the charges in transmission during the positive clock transmission to ground.

Figure 14:
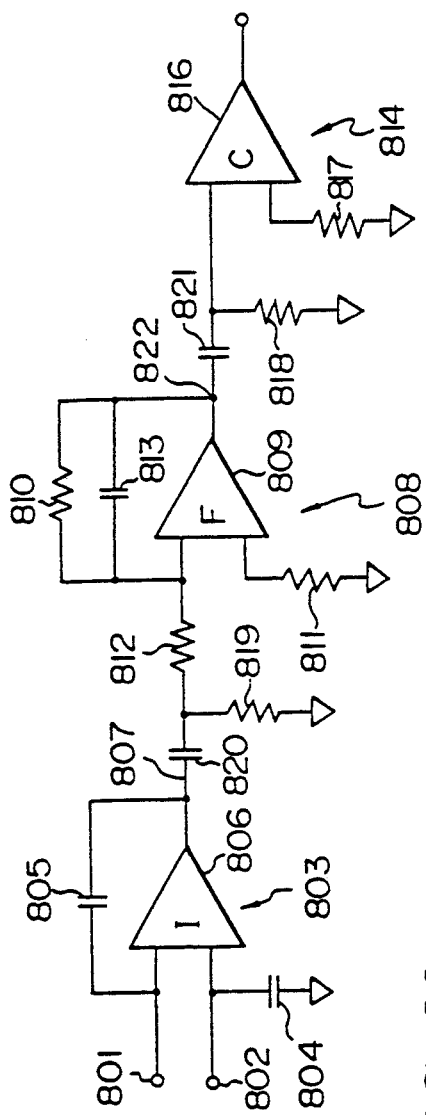
FIG. 14 is a detail of the Analogue Receiving Blocks of FIG. 8.

FIG. 14 illustrates a typical Analogue Receiving Block of the invention. The input signals 801 and 802 are connected to the inputs of a charge amplifier 803. Charge amplifier 803 includes two capacitors 804 and 804 and an operational amplifier 806. In this configuration the output at point 807 is proportional to the difference between the ratios of the capacitive loads at inputs 801 and 802 to the values of capacitances 805 and 804 respectively.

The output of charge amplifier 807 is connected to a low pass filter 808. Filter 808 in this embodiment is an active filter including an operational amplifier 809 and appropriate resistances 810 811 and 812 and capacitor 813. Design of active low pass filters is well established and no further elaboration is necessary. Low pass filter 808 functions as a phase detector.

The analogue receiving block consists of a charge amplifier 803, a low-pass filter 808 and a comparator 814. The charge amplifier inputs 801 and 802 are via the previous described switch network connected to the receiver electrodes in the transducer, which have a source impedance that is capacitive. Thus the voltage transients from the input of the transducer are transformed to voltage transients on the output of operational amplifier 806 with an amplitude that is proportional to the ratio of the coupling capacitance through the transducer to the feedback capacitors 805 and 804. For DC stabilization of the amplifier output there are also a resistor of very high value parallel to each of the capacitors 805 and 804. Those resistors are not shown in the FIG. 14.

The signal 807 on the output of charge amp 803 is shown in the timing diagram of FIG. 15 for two different position of angular movement 807a and 807b. The phase position of this signal is proportional to the mechanical position of the collar electrode pattern relative to the axle electrode pattern.

The signal 807 is High pass filtered by the network 820-819, serving to eliminate any DC voltage existing on the amplifier output. The filter 808 consists of an operational amplifier 809 with connected resistors and capacitors, dimensioned to function as a low pass filter with the purpose of smoothing out the staircase waveform on signal 807 to be more continuous without any steep transients. The thus obtained waveform on output of the amplifier 809 is illustrated in FIG. 15. The waveform is illustrated for two angular positions under number 822a and 822b respectively. The location of the zero crossings of these waveforms represent the mechanical position.

The signal 822 is via the high-pass filter 821/818 transferred to the comparator circuit 814. It contains the comparator 816 with the resistors 817 and 818 connecting its input terminals to a suitable bias level. The output from comparator 816 will be a square wave with its flanks coincident with the zero crossings of the 822 signal. The square wave output from each of the four analogue receiving blocks 611-614 (FIG. 8) is then triggering each one its latch for getting a digital representation of the phaseshift and thereby the mechanical position for each channel.

Figure 16:
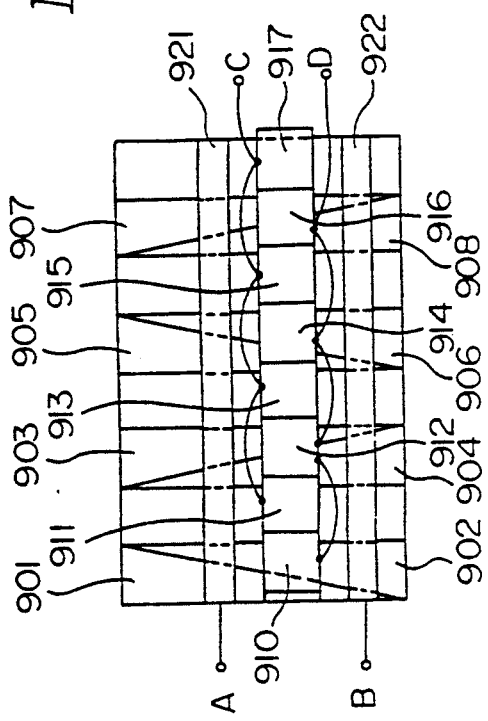
FIG. 16 is a plan view of the unwrapped electrodes of a fourth embodiment of the invention.

FIG. 16 shows an embodiment of the invention where only the collar electrodes have galvanic connection to the electronics. On the axle 1 are freefloating electrodes 901-908 configured the same way as the transmitter electrodes in the FIG. 2 embodiment. Between the rectangular electrode-pairs (composed of two triangular conjugate electrodes) are grounded areas of equal width as the mentioned rectangular electrodes. On the collar are an array of rectangular electrodes 910-917 connected in two groups, every second to the same group, with output terminals C and D. Furthermore, on the collar are two ring electrodes, 921 and 922, and one on each side of the 910-917 array. Output terminals for these two ring electrodes are A and B.

Examining a single section it is apparent that the capacitance between ring electrode 921 and electrode 901 is equal to a constant times the axial displacement plus the distance between 921 and 910. The capacitance between ring electrode 922 and electrode 901 is equal to a constant times the axial displacement minus the distance between 921 and 910. The capacitance between ring electrode 921 and electrode 902 is equal to a constant times 1 minus the axial displacement minus the distance between 921 and 910. The capacitance between ring electrode 922 and electrode 902 is equal to a constant times 1 minus the axial displacement plus the distance between 921 and 910. The capacitance between electrode 910 and electrode 901 is equal to a constant times the axial displacement. Finally, the capacitance between electrode 910 and electrode 902 is equal to a constant times 1 minus the axial displacement. Solving for the total capacitance of the circuit we find that the signal delivered between C and D when a signal is inputed to A and B is equal to the signal at A times the axial displacement plus the distance between the ring and center electrodes divided by three added to the signal on B times one minus the axial displacement minus the distance between the ring and center electrodes. Thus the signal is directly proportional to the axle displacement. Similar calculations apply to angular displacements.

Figure 17:
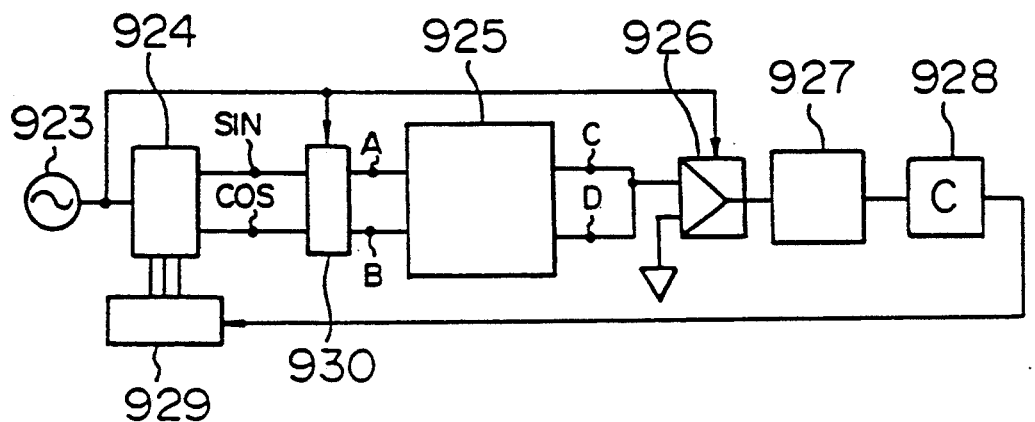
FIG. 17 is a block diagram of the electronics of the FIG. 16 embodiment set to measure axial displacements.

For making axial measurements a circuit according to FIG. 17 can be used. Terminal A is fed with a signal sine(wt) while the B terminal is fed with cosine(wt). On terminals C+D in parallel we will then get a signal, whose phase position relative to the input signals is a one to one function of the axial position.

Figure 18:
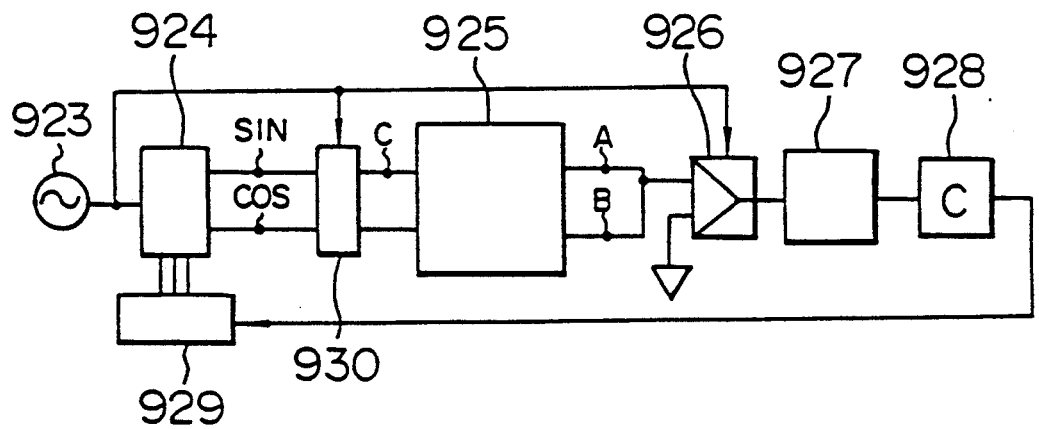
FIG. 18 is a block diagram of the electronics of the FIG. 16 embodiment set to measure angular displacements.

For making the angular position the same electronic circuit can be used, but the terminals have changed role as shown in FIG. 18. Terminals C and D are fed with cosinus and sinus signals respectively, and terminals A+B are in parallel connected to the receiver input of the electronics. The phase of the received signal will have a one to one relation to the angular position within a limited range (max 45 degrees for the illustrated embodiment with four periods of pattern around the circumference.

The electronics in FIGS. 17 and 18 include an oscillator 923, a frequency divider and sin/cos synthesizer 924, a receiver amplifier 926, a filter 927 a comparator 928, and a latch 929. The transducer is 925. The Frequency divider divides the clock frequency by for instance 256, which number is dimensioned for the rate of resolution that can be achieved in the measurement. The sin and cos signal can be created by a digital sin or cos synthesizer from the binary data in the divider, but it is also possible to use quadrature square waves of the lowest frequency out from the divider if we have a suitable filtering in the filter 927 of the receiver side for extracting the fundamental component out of the received signal. In the modulator 930, the low frequency sin/cos signals (or quadrature square waves) are modulated by the clock frequency for obtaining a high frequency signal through the transducer. On the receiver side the received signal is demodulated and amplified in unit 926 and a low frequency waveform is obtained. The filter 927 extracts the harmonic component out of this signal and a clean signal with information of the position embedded in its phase angle relative to the transmitting LF signal is obtained. In the comparator 928, the zero-crossings of the sine wave is detected and a square wave is created. This square wave is triggering the latch 929 and a digital representation of the position is obtained.

The two functions represented by FIGS. 17 and 18 can be multiplexed with the help of Cmos switches as described in other embodiments of the invention and nearly simultaneous indication of both angular and axial position can be obtained. The multiplexing is preferably done at a high frequency relative to the LF modulation for the filters to be subject to a continuous signal of the detected frequency. This also means that the receiving section has to be separate for each measuring channel, but the transmitting section can be multiplexed.

The role of the transmitter and receiver plates can be reversed, with appropriate modification of the electronic unit. The information about position in both directions is contained in the capacitive couplings between the electrode groups, which can be measured with various means, including standard capacitance measuring instruments, and the so obtained values can be utilized for calculating the mechanical position.

The shapes of the electrode plates can, within the invention idea, be varied for obtaining a desired nonlinear function for the output signals representing the position in the two directions, or for adapting to different signal processing means. The sinsoidial function for the capacitance that is desirable for measuring over long absolute range with the phase measurement method described in one of above embodiments, can be approximated with rectangular electrodes placed in a periodic pattern (an array) in the measurement direction. Also, the pattern on the collar can be extended in the axial direction over longer distance than illustrated above, with several rings of electrodes making a periodic pattern in the axial direction. In such a case, a multiphase receiver for the axial measurement direction is an option. On the other hand, the collar electrodes can also be simplified to be only one electrode ring also in the multiperiod version of FIG. 7.

The embodiments illustrated are for the purpose of example only. The invention is limited only by the subjoined claims.

I claim:

1. A system for measuring the relative position between first and second objects in first and second orthogonal directions, said system comprising:

a plurality of rows of electrodes mounted on said first object, said rows being spaced apart from each other in said second direction with the spacing between each of said rows and any adjacent row being substantially constant, said rows of electrodes and the electrodes in said rows each having an elongated configuration with a longitudinal axis extending in said first direction, each of said row of electrodes containing a first electrode and at least a second electrode of substantially equal length in said first direction, the electrodes in each of said rows being positioned adjacent each other in said second direction, the sum of the dimensions in said second direction of all of the electrodes in each of said rows that are used to measure in said second direction being constant along the length of said row in said first direction, and the dimension in said second direction of said first electrode relative to the dimension in said second direction of said second electrode varying along said first direction;

a coupling electrode mounted on said second object adjacent the electrodes mounted on said first object so that said coupling electrode is spaced apart from said rows of electrodes in a third direction that is orthogonal to said first and second directions, said coupling electrode having a dimension in said second direction that is at least equal to the distance in said second direction between one edge of a row that receives a first electrical signal during a measurement in said second direction and the corresponding edges of a corresponding row that receives a second electrical signal during a measurement in said second direction;

first electronic means operatively connected to said coupling electrode and to the electrodes in said rows of electrodes for comparing a first signal that is a function of the capacitive coupling between at least a portion of said coupling electrode and the adjacent electrodes in at least one of said rows with a second signal that is a function of the capacitive coupling between at least one other said coupling electrode and the adjacent electrodes in at least one other of said rows to measure the relative positions between said first and second objects in said second direction; and second electronic means operatively connected to said coupling electrode and to the electrodes in said rows of electrodes for comparing a third signal that is a function of the capacitive coupling between at least said first electrode in at least one of said rows of electrodes and said adjacent coupling electrode with a fourth signal that is a function of the capacitive coupling between at least said second electrode in at least one of said rows of electrodes and said adjacent coupling electrode to measure the relative positions between said first and second objects in said first direction.

2. The system of claim 1 wherein the ratio between the dimension of said first electrode and the dimension of said second electrode in said second direction is the same for a plurality of said rows of electrodes at the same position in said first direction, and wherein said second electronic means determines the relative position between said first and second objects in said first direction by applying a first common signal to the first electrode in one row of electrodes and to the first electrode in at least one other row of electrodes, and wherein said second electronic means determines the relative position between said first and second objects in said first direction by applying a second common signal to the second electrode in said one row of electrodes and to the second electrode in said at least one other row of electrodes such that the capacitive coupling between said coupling electrode and the first electrodes in said rows of electrodes is compared to the capacitive coupling between said coupling electrode and the second electrodes in said rows of electrodes.

3. The system of claim 1 wherein said first and second electrodes in each of said rows of electrodes have a triangular configuration so that the capacitive coupling between said coupling electrode and said first and second electrodes varies in a linear manner in said first direction, said triangular first and second electrodes being arranged so that together they have a rectangular configuration.

4. The system of claim 1 wherein said first and second electrodes in each of said rows have a periodic configuration so that the capacitive coupling between said coupling electrode and said first and second electrodes varies in a periodic manner in said first direction.

5. The system of claim 4 wherein said periodic configuration is sinusoidal so that said capacitive coupling between said coupling electrode and said first and second electrodes to varies in a sinusoidal manner in said first direction.

6. The system of claim 4 wherein the spatial frequency of the electrodes in adjacent first and second rows differ from each other in a predetermined manner, and wherein said second electronic means further includes means for measuring the relative position between said first and second objects in said first direction over a range covering a plurality of cycles of the periodic electrodes in said first and second rows, said measuring means comprising:
  first analysis means for comparing the capacitive coupling between said coupling electrode and each of the electrodes in said first row to determine the spatial phase of the periodic electrodes in said first row that are opposite said coupling electrode;
  second analysis means for comparing the capacitive coupling between said coupling electrode and each of the electrodes in said second row to determine the spatial phase of the periodic electrodes in said second row that are opposite said coupling electrode;
  comparison means for comparing the spatial phase of the periodic electrodes in said first row with the spatial phase of the periodic electrodes in said second row; and
  calculating means for determining the relative position between said first and second objects in said first direction from the difference in the spatial phases of the electrodes in said first and second rows and the spatial periods of the periodic electrodes in said first and second rows.

7. The system of claim 5 wherein said rows of electrodes each further includes a third electrode having a sinusoidal configuration, said first, second, and third electrodes being arranged so that they are phased 120 degrees apart from each other and so that together they have a dimension in said second direction that is constant with respect to said first direction.

8. The system of claim 1 wherein said first and second directions are in respective axial and circumferential directions.

9. The system of claim 1 wherein said first object is a cylindrical axle the circumference of which constitutes said second direction and the longitudinal axis of which constitutes said first direction, and wherein said second object is a cylindrical collar surrounding said shaft.

10. The system of claim 1 wherein said second electronic means for measuring the relative position between said first and second objects in said first direction comprise:
  first signal generating means for applying a signal to the first electrode in at least one of said rows of electrodes;
  first measuring means for determining a property of a first signal derived from a signal coupled to said coupling electrode from the signal applied to said first electrode;
  second signal generating means for applying a signal to the second electrode in at least one of said rows of electrodes;
  second measuring means for determining the property of a second signal derived from a signal coupled to said coupling electrode from the signal applied to said second electrode; and
  comparison means for comparing the property of said first signal to the property of said second signal.

11. The system of claim 1 wherein said second electronic means for measuring the relative position between said first and second objects in said first direction comprise:
  signal generating means for applying a signal to said coupling electrode;
  first measuring means for determining a property of a first signal derived from a signal coupled to the first electrode of at least one of said rows of electrodes from the signal applied to said coupling electrode;
  second measuring means for determining the property of a second signal derived from a signal coupled to at least the second electrode of at least one of said rows of electrodes from the signal applied to said coupling electrode; and
  comparison means for comparing the property of said first signal to the property of said second signal.

12. The system of claim 1 wherein said first electronic means comprise:
  first signal generating means for applying a signal to all of the electrodes in one row of electrodes;
  first measuring means for determining a property of a first signal derived from a signal coupled to said coupling electrode from the signal applied to the electrodes in said one row of electrodes;
  second signal generating means for applying a signal to all of the electrodes in at least one other row of electrodes;
  second measuring means for determining the property of a second signal derived from a signal coupled to said coupling electrode from the signal applied to the electrodes in said other row of electrodes; and
  first comparison means for comparing the property of said first signal to the property of said second signal.

13. The system of claim 1 wherein said first electronic means further includes means for measuring the relative position between said first and second objects in said second direction in two scales, said means comprising:

first signal generating means for applying a signal to all of the electrodes in a first plurality of rows that are positioned adjacent each other to effectively provide a first row of electrodes having a relatively large dimension in said second direction;

second signal generating means for applying a signal to all of the electrodes in a second plurality of rows that are positioned adjacent each other to effectively provide a second row of electrodes having a relatively large dimension in said second direction;

first measuring means for determining a property of a first signal derived from a signal coupled to at least a portion of said coupling electrode from the signal applied to the electrodes in said first row of electrodes;

second measuring means for determining the property of a second signal derived from a signal coupled to at least a portion of said coupling electrode from the signal applied to the electrodes in said second row of electrodes;

first comparison means for comparing the property of said first signal to the property of said second signal to determine the relative position between said first and second objects in said second direction in a relatively coarse scale;

third signal generating means for applying a signal to all of the electrodes in a first number of adjacent rows, the number of rows to which said signal is applied being at least equal to 1 but less than the number of rows in said first plurality of rows to effectively provide a third row of electrodes having a relatively small dimension in said second direction;

fourth signal generating means for applying a signal to all of the electrodes in a second number of adjacent rows, the number of rows to which said signal is applied being at least equal to 1 but less than the number of rows in said second plurality of rows to effectively provide a fourth row having a relatively small dimension in said second direction;

third measuring means for determining a property of a third signal derived from a signal coupled to at least a portion of said coupling electrode from the signal applied to the electrodes in said third row of electrodes;

fourth measuring means for determining the property of a fourth signal derived from a signal coupled to at least a portion of said coupling electrode from the signal applied to the electrodes in said fourth row of electrodes; and second comparison means for comparing the property of said third signal to the property of said fourth signal to determine the relative position between said first and second objects in said second direction in a relatively fine scale.

14. The system of claim 13 wherein said signal generating means comprise:
an oscillator generating a periodic signal;
a multiplexer selectively coupling said periodic signal to said electrodes in response to a control signal; and
a processor operatively connected to said multiplexer, said processor generating said control signal to selectively apply said periodic signal to predetermined combinations of said electrodes.

15. The system of claim 14 wherein said multiplexer additionally selectively couples and uncouples portions of said coupling electrode in response to a control signal, and said processor additionally generates said control signal to selectively connect and disconnect predetermined combinations of portions of said coupling electrode.

16. The system of claim 1 wherein said first electronic means for measuring the relative position between said first and second objects in said second direction comprises:
signal generating means for applying a signal to said coupling electrode;
first measuring means for determining a property of a first signal derived from a signal coupled to all of the electrodes in at least one row of electrodes from the signal applied to said coupling electrode;
second measuring means for determining the property of a second signal derived from a signal coupled to all of the electrodes in at least one other row of electrodes from the signal applied to said coupling electrodes; and
comparison means for comparing the property of said first signal to the property of said second signal.

17. The system of claim 1 said first electronic means further includes means for measuring the relative position between said first and second objects in said second direction in two scales, said means comprising:
first comparison means for comparing the capacitive coupling between at least a portion of said coupling electrode and all of the electrodes in a first plurality of rows that are positioned adjacent each other with the capacitive coupling between at least a portion of said coupling electrode and all of the electrodes in a second plurality of rows that are positioned adjacent each other to measure the relative positions between said first and second objects in said second direction in a relatively coarse scale; and
second comparison means for comparing the capacitive coupling between at least a portion of said coupling electrode and all of the electrodes in a first number of adjacent rows with the capacitive coupling between at least a portion of said coupling electrode and all of the electrodes in a second number of adjacent rows, said first and second number of rows being at least equal to 1 but less than the number of rows in said first and second plurality of rows, respectively, thereby measuring the relative positions between said first and second objects in said second direction in a relatively fine scale.

18. The system of claim 1, further including at least one pickup electrode mounted on said first object so that it is adjacent but spaced apart from said coupling electrode in a third direction that is orthogonal to said first and second directions, and wherein said electronic means needs no direct connection to said coupling electrode and further includes means for measuring the magnitude of a signal derived from a signal applied to the electrodes in said row of electrodes and coupled from the electrodes in said row of electrodes to said coupling electrode, and from said coupling electrode to said pickup electrode.

19. The system of claim 1 wherein said coupling electrode is divided into a plurality of subelectrodes positioned adjacent each other in said second direction, each of said subelectrodes having a dimension in said second direction that at least as large as the dimension of said rows in said second direction.

20. The system of claim 19 wherein the sum of the dimensions in said first direction of all of said coupling subelectrodes that are used to measure in said first direction is constant along said second direction.

21. The system of claim 19 wherein said subelectrodes are adjacently placed at a minimum spacing in said second direction which is sufficient to maintain electrical isolation.

22. The system of claim 19 wherein said coupling subelectrodes have a dimension in said second direction which is substantially equal to the distance between corresponding edges of said rows of electrodes in said second direction and all of said rows are of substantially equal dimension in said second direction.

23. The system of claim 19 wherein said first electronic means includes means for comparing the capacitive coupling between at least one subelectrode of said coupling electrode and all of the electrodes in at least two of said rows with the capacitive coupling between at least one other subelectrode of said coupling electrode and all of the electrodes in at least two of said rows.

24. The system of claim 1 wherein said coupling electrode has a periodic configuration so that the capacitive coupling between said coupling electrode and all of the electrodes in said row varies in a periodic manner when said objects move relative to each other in said second direction.

25. The system of claim 1 wherein corresponding electrodes in a first set of said rows are interconnected with each other, and wherein corresponding electrodes in a second set of rows are interconnected with each other, the rows in said first set alternating with the rows in said second set.

26. The system of claim 25 wherein said coupling electrode is divided into a plurality of subelectrodes having respective periodic configurations with differing spatial phases and a common spatial period corresponding to the distance in said second direction between an electrode edge in one set and the adjacent corresponding electrode edge in the same set, and wherein said first electronic means for measuring the relative position between said first and second objects in said second direction includes means for comparing a signal that is a function of the capacitive coupling between selected subelectrodes of said coupling electrode and all of the adjacent electrodes in said first and second sets of rows with a signal that is a function of the capacitive coupling between selected other subelectrodes of said coupling electrode and all of the adjacent electrodes in said first and second sets of rows.

27. The system of claim 1 wherein said coupling electrode has a dimension in said second direction that is substantially equal to an integer multiple "N," N greater than or equal to 1, times the distance in said second direction between one edge of a row that receives a first electrical signal during measurement in said second direction and the corresponding edge of a corresponding row that receives a second electrical signal during measurement in said second direction.

28. The system of claim 1 wherein the dimension in said first direction of said coupling electrode is constant along said second direction.

29. The system of claim 1, further comprising:
dividing said coupling electrode into at least two subelectrodes, each having substantially the same dimension in said second direction that is substantially equal to an integer multiple "N," N greater than or equal to 1, of the distance in said second direction between one edge of a row that receives a first electrical signal during measurement in said second direction and the corresponding edge of a corresponding row that receives a second electrical signal during measurement in said second direction;

wherein said first electronic means is operatively connected to at least one coupling subelectrode for comparing said first signal, that is a function of the capacitive coupling between at least one subelectrode of said coupling electrode and the adjacent electrodes in at least one of said rows, with said second signal that is a function of the capacitive coupling between at least one operatively connected subelectrode of said coupling electrode and the adjacent electrodes in at least one other of said rows, to measure the relative positions between said first and second objects in said second direction; and wherein said second electronic means is operatively connected to at least one coupling subelectrode for comparing said third signal, that is a function of the capacitive coupling between said first electrode in at least one of said rows of electrodes and at least one adjacent coupling subelectrode, with said fourth signal that is a function of the capacitive coupling between at least said second electrode in at least one of said rows of electrodes and at least one adjacent coupling subelectrode, to measure the relative positions between said first and second objects in said first direction.

30. A method of measuring the relative position between first and second objects in first and second orthogonal directions, said method comprising:

mounting a plurality of rows of electrodes on said first object, said rows being spaced apart from each other in said second direction with the spacing between each of said rows and any adjacent row being substantially constant, said rows and the electrodes in each of said rows having an elongated configuration with a longitudinal axis extending in said first direction, each of said rows of electrodes containing a first electrode and at least a second electrode of substantially equal length in said first direction, the electrodes in each of said rows being positioned adjacent each other in said second direction, the sum of the dimensions in said second direction of all of the electrodes in each of said rows that are used to measure in said second direction being constant along the length of said row in said first direction, and the dimension in said second direction of said first electrode relative to the dimension in said second direction of said second electrode varying along said first direction;

mounting a coupling electrode on said second object adjacent said rows of electrodes so that it is spaced apart from said rows of electrodes in a third direction that is orthogonal to said first and second directions, said coupling electrode having a dimension in said second direction that is at least equal to the distance in said second direction between one edge of a row that receives a first electrical signal during a measurement in said second direction and the corresponding edge of a corresponding row that receives a second electrical signal during a measurement in said second direction;

comparing the capacitive coupling between said coupling electrode and the adjacent electrodes in at least one of said rows with the capacitive coupling between said coupling electrode and the adjacent electrodes in at least one other of said rows to measure the relative positions between said first and second objects in said second direction; and comparing the capacitive coupling between said first electrode in at least one of said rows of electrodes and said adjacent coupling electrode with the capacitive coupling between said second electrode in at least one of said rows of electrodes and said adjacent coupling electrode to measure the relative positions between said first and second objects in said first direction.

31. The method of claim 30 wherein said coupling electrode has a dimension in said second direction which is substantially equal to the distance between corresponding edges of said rows of electrodes in said second direction.

32. The method of claim 30 wherein the capacitive coupling between said first electrode in at least one of said rows of electrodes and said adjacent coupling electrode is compared with the capacitive coupling between all electrodes in that same row of electrodes and said adjacent coupling electrode to measure the relative positions between said first and second objects in said first direction.

33. The method of claim 30 wherein the ratio between the dimension of said first electrode and the dimension of said second electrode in said second direction is the same for a plurality of said rows of electrodes at the same position in said first direction, and wherein the relative position between said first and second objects in said first direction is measured with the first electrode in one row of electrodes connected to the first electrode in at least one other row of electrodes, and the second electrode in said one row of electrodes connected to the second electrodes in said other row of electrodes such that said first signal is a function of the capacitive coupling between said coupling electrode and the first electrodes in a plurality of said rows of electrodes, and said second signal is a function of the capacitive coupling between said coupling electrode and the second electrodes in a plurality of said rows of electrodes.

34. The method of claim 30 wherein said first and second electrodes in each of said rows of electrodes have a triangular configuration so that the capacitive coupling between said coupling electrode and said first and second electrodes varies in a linear manner in said first direction, and wherein the triangular first and second electrodes are arranged so that together they have a rectangular configuration.

35. The method of claim 30 wherein said first and second electrodes in each of said rows have a periodic configuration so that the capacitive coupling between said coupling electrode and said first and second electrodes varies in a periodic manner in said first direction.

36. The method of claim 35 wherein said periodic configuration causes said capacitive coupling between said coupling electrode and said first and second electrodes to vary in a sinusoidal manner in said first direction.

37. The method of claim 35 wherein the spatial frequency of the electrodes in adjacent first and second rows differ from each other in a predetermined manner, and wherein the relative position between said first and second objects is measured in said first direction over a range covering a plurality of cycles of the periodic electrodes in said first and second rows by the steps of:

determining the spatial phase of the periodic electrodes opposite the coupling electrode in said first row by comparing the capacitive coupling between said coupling electrode and each of the electrodes in said first row;

determining the spatial phase of the periodic electrodes opposite the coupling electrode in said second row by comparing the capacitive coupling between said coupling electrode and each of the electrodes in said second row;

comparing the spatial phase of the periodic electrodes in said first row with the spatial phase of the periodic electrodes in said second row; and determining the relative position between said first and second objects in said first direction within said range from the difference in the spatial phases of the electrodes in first and second rows and the spatial periods of the periodic electrodes in said first and second rows.

38. The method of claim 37 wherein said spatial frequency in said first row is a higher frequency than in said second row, and wherein after said relative position determination in said first direction to define position with relatively coarse resolution, the capacitive coupling between said coupling electrode and said first electrode in said first row is compared with the capacitive coupling between said coupling electrode and at least said second electrode in said first row to measure the relative positions between said first and second objects to a relative finer resolution and accuracy and combining the coarse and fine resolution measurements to measure position unambiguously and absolutely in said first direction.

39. The method of claim 36 wherein said rows of electrodes each further includes a third electrode having a sinusoidal configuration, said first, second, and third electrodes being arranged so that they are phased 120 degrees apart from each other and so that together they have a dimension in said second direction that is constant with respect to said first direction.

40. The method of claim 30 wherein said first and second directions are in respective axial and circumferential directions.

41. The method of claim 30 wherein the relative position between said first and second objects in said first direction is measured by the steps of:

applying a signal to the first electrode in at least one of said rows of electrodes;

obtaining a first signal that is derived from a signal coupled to said coupling electrode from the signal applied to said first electrode;

applying a signal to at least the second electrode in at least one of said rows of electrodes;

obtaining a second signal that is derived from a signal coupled to said coupling electrode from the signal applied to at least said second electrode; and comparing a property of said first signal to a property of said second signal.

42. The method of claim 41 wherein said property is the magnitude of the voltages of said first and second signals.

43. The method of claim 41 wherein said property is the magnitude of the phases of said first and second signals.

44. The method of claim 30 wherein the relative position between said first and second objects in said first direction is measured by the steps of:

applying a signal to said coupling electrode;

obtaining a first signal that is derived from a signal coupled to said first electrode from the signal applied to said coupling electrode;

obtaining a second signal that is derived from a signal coupled to the second electrode in at least one of said rows of electrodes from the signal applied to said coupling electrode; and comparing a property of said first signal to a property of said second signal.

45. The method of claim 30 wherein the relative position between said first and second objects in said second direction is measured by the steps of:

applying a signal to all of the electrodes in one row of electrodes;

obtaining a first signal that is derived from a signal coupled to said coupling electrode from the signal applied to the electrodes in said one row of electrodes;

applying a signal to all of the electrodes in another row of electrodes;

obtaining a second signal that is derived from a signal coupled to said coupling electrode from the signal applied to the electrodes in said other row of electrodes; and comparing a property of said first signal to a property of said second signal.

46. The method of claim 45 wherein the relative position between said first and second objects in said second direction is measured in two scales by the steps of:

applying a signal to all of the electrodes in a first plurality of rows that are positioned adjacent each other to effectively provide a first row of electrodes having a relatively large dimension in said second direction;

obtaining a first signal that is derived from a signal coupled to at least a portion of said coupling electrode from the signal applied to the electrodes in said first row of electrodes;

applying a signal to all of the electrodes in a second plurality of rows that are positioned adjacent each other to effectively provide a second row of electrodes having a relatively large dimension in said second direction;

obtaining a second signal that is derived from a signal coupled to at least a portion of said coupling electrode from the signal applied to the electrodes in said second row of electrodes;

determining the relative position between said first and second objects in said second direction in a relatively coarse scale by comparing a property of said first signal to a property of said second signal;

applying a signal to all of the electrodes in a first number of adjacent rows, the number of rows to which said signal is applied being at least equal to one but less than the number of rows in said first plurality of rows to effectively provide a third row of electrodes having a relatively small dimension in said second direction;

applying a signal to all of the electrodes in a second number of adjacent rows, the number of rows to which said signal is applied being at least equal to one but less than the number of rows in said second plurality of rows to effectively provide a fourth row having a relatively small dimension in said second direction;

obtaining a third signal that is derived from a signal coupled to at least a portion of said coupling electrode from the signal applied to the electrodes in said third row of electrodes;

obtaining a fourth signal that is derived from a signal coupled to at least a portion of said coupling electrode from the signal applied to the electrodes in said fourth row of electrodes; and determining the relative position between said first and second objects in said second direction in a relatively fine scale by comparing a property of said third signal to a property of said fourth signal.

47. The method of claim 46 wherein said third and fourth rows are of equal width and adjacently placed and said third row of electrodes is adjacently repeated alternately with said fourth row of electrodes at least once and connected to form a set considered to be the said third electrode and said fourth row of electrodes is adjacently repeated alternately with said third row of electrodes at least once and connected to form a set considered to be said fourth electrode.

48. The method of claim 47 wherein said coupling electrode is divided into at least two subelectrodes which have a periodic configuration so that the capacitive coupling between said subelectrodes and said rows varies in a periodic manner when moving in said second direction.

49. The method of claim 48 wherein said periodic configuration is sinusoidal with a spatial period substantially equal to the spatial period of the electrode rows within the set comprising said third or fourth electrode.

50. The method of claim 30 wherein the relative position between said first and second objects in said second direction is measured by the steps of:

applying a signal to said coupling electrode;

obtaining a first signal that is derived from a signal coupled to all of the electrodes in one row of electrodes from the signal applied to said coupling electrode;

obtaining a second signal that is derived from a signal coupled to all of the electrodes in another row of electrodes from the signal applied to said coupling electrodes; and comparing a property of said first signal to a property of said second signal.

51. The method of claim 30 wherein the relative position between said first and second objects in said second direction is measured in two scales by the steps of:

comparing the capacitive coupling between at least a portion of said coupling electrode and all of the electrodes in a first plurality of rows that are positioned adjacent each other with the capacitive coupling between at least a portion of said coupling electrode and all of the electrodes in a second plurality of rows that are positioned adjacent each other to measure the relative positions between said first and second objects in said second direction in a relatively coarse scale; and comparing the capacitive coupling between at least a portion of said coupling electrode and all of the electrodes in a first number of adjacent rows with the capacitive coupling between at least a portion of said coupling electrode and all of the electrodes in a second number of adjacent rows, said first and second number of rows being at least equal to one but less than the number of rows in said first and second plurality of rows, respectively, thereby measuring the relative positions between said first and second objects in said second direction in a relatively fine scale.

52. The method of claim 30 wherein said steps of comparing the capacitive coupling includes the steps of:
applying signals to at least one of the electrodes in said rows of electrodes;
mounting at least one pickup electrode on said first object so that it is adjacent but spaced apart from said coupling electrode in a third direction that is orthogonal to said first and second directions; and
detecting a signal on said pickup electrode resulting from the signal applied to at least one of the electrodes in said rows of electrodes being coupled from the electrodes in said row of electrodes to said coupling electrode, and from said coupling electrode to said pickup electrode.

53. The method of claim 30 wherein said coupling electrode is divided into a plurality of subelectrodes mounted on said second object, each of said coupling subelectrodes having a dimension in said second direction selected so that each of said coupling subelectrodes cannot completely overlay more than one of said rows.

54. The method of claim 53 wherein the sum of the dimensions in said first direction of all of said coupling subelectrodes that are used to measure in said first direction is constant along said second direction.

55. The method of claim 53 wherein said subelectrodes are adjacently placed at a minimum spacing in said second direction which is sufficient to maintain electrical isolation.

56. The method of claim 30 wherein said coupling electrode is divided into a plurality of subelectrodes positioned adjacent each other in said second direction, each of said subelectrodes having a dimension in said second direction that is at least as large as the dimension of said rows in said second direction, and wherein the relative position between said first and second objects is measured in said second direction by the steps of comparing the capacitive coupling between at least one subelectrode of said coupling electrode and its adjacent rows with the capacitive coupling between at least one other subelectrode of said coupling electrode and its adjacent rows.

57. The method of claim 56 wherein said coupling subelectrodes have a dimension in said second direction which is substantially equal to the distance between corresponding edges of said rows of electrodes in said second direction and all of said rows are of substantially equal dimension in said second direction.

58. The method of claim 30 wherein said coupling electrode has a periodic configuration so that the capacitive coupling between said coupling electrode and all of the electrodes in said row varies in a periodic manner when said objects move relative to each other in said second direction.

59. The method of claim 58 wherein the coupling between said coupling electrode and the electrodes in said rows is determined by the step of comparing the capacitive coupling between said coupling electrode and a first set of said rows with the capacitive coupling between said coupling electrode and a second set of said rows, the rows in said first set alternating with the rows in said second set, when measuring in said second direction.

60. The method of claim 59 wherein said coupling electrode is divided into a plurality of subelectrodes having respective periodic configurations with differing spatial phases and a common spatial period corresponding to the distance in said second direction between an electrode edge in one set and the adjacent corresponding electrode edge in the same set, and wherein the relative position between said first and second objects in said second direction is measured by the step of comparing the capacitive coupling between selected subelectrodes of said coupling electrode and all of the electrodes in said first and second sets of rows with the capacitive coupling between selected other subelectrodes of said coupling electrode and all of the electrodes in said first and second sets of rows.

61. The method of claim 30 wherein said coupling electrode has a dimension in said second direction that is substantially equal to an integer multiple "N," N greater than or equal to 1, time the distance in said second direction between one edge of a row that receives a first electrical signal during measurement in said second direction and the corresponding edge of a corresponding row that receives a second electrical signal during measurement in said second direction.

62. The method of claim 30 wherein the dimension in said first direction of said coupling electrode is constant along said second direction.

63. The method of claim 30, further comprising:
dividing said coupling electrode into at least two subelectrodes, each having substantially the same dimension in said second direction that is substantially equal to an integer multiple "N," N greater than or equal to 1, of the distance in said second direction between one edge of a row that receives a first electrical signal during measurement in said second direction and the corresponding edge of a corresponding row that receives a second electrical signal during measurement in said second direction;
wherein the capacitive coupling between at least one subelectrode of said coupling electrode and the adjacent electrodes in at least one of said rows is compared with the capacitive coupling between at least one subelectrode of said coupling electrode and the adjacent electrodes in at least one other of said rows to measure the relative positions between said first and second objects in said second direction; and
wherein the capacitive coupling between said first electrode in at least one of said rows of electrodes and at least one adjacent coupling subelectrode is compared with the capacitive coupling between at least said second electrode in at least one of said rows of electrodes and at least one adjacent coupling subelectrode, to measure the relative positions between said first and second objects in said first direction.

64. A method of measuring the relative position between first and second objects in a first direction, said method comprising:
mounting at least one row of electrodes on said first object, said row containing a first electrode and at least a second electrode of substantially equal length in said first direction, said row of electrodes and the electrodes in said row having an elongated configuration with a longitudinal axis extending in said first direction, the dimension in a second direction of said first electrode relative to the dimension in said second direction of said second electrode varying along said first direction said second direction being orthogonal to said first direction;
mounting a coupling electrode on said second object adjacent said row of electrodes so that it is spaced apart from said row of electrodes in a third direction that is orthogonal to said first and second directions; and comparing the capacitive coupling between said coupling electrode and said first electrode in said row with the capacitive coupling between said coupling electrode and said second electrode in said row, thereby measuring the relative positions between said first and second objects in said first direction.

65. The method of claim 64 wherein said first and second electrodes have a triangular configuration so that the capacitive coupling between said coupling electrode and said first and second electrodes varies in a linear manner in said first direction.

66. The method of claim 64 wherein said first and second electrodes have a periodic configuration so that the capacitive coupling between said coupling electrode and said first and second electrodes varies in a periodic manner in said first direction.

67. The method of claim 66 wherein first and second rows of electrodes are mounted on said first object with said rows of electrodes and the electrodes in said rows of electrodes being positioned adjacent each other in said second direction, wherein the spatial frequency of the electrodes in adjacent first and second rows differ from each other in a predetermined manner, and wherein the relative position between said first and second objects is measured in said first direction over a range covering a plurality of cycles of the periodic electrodes in said first and second rows by the steps of:

determining the spatial phase of the periodic electrodes in said first row that are opposite said coupling electrode by comparing the capacitive coupling between said coupling electrode and each of the electrodes in said first row;

determining the spatial phase of the periodic electrodes in said second row that are opposite said coupling electrode by comparing the capacitive coupling between said coupling electrode and each of the electrodes in said second row;

comparing the spatial phase of the periodic electrodes in said first row with the spatial phase of the periodic electrodes in said second row; and determining the relative position between said first and second objects in said first direction within said range from the difference in the spatial phases of the electrodes in first and second rows and the spatial periods of the periodic electrodes in said first and second rows.

68. The method of claim 64 wherein the relative position between said first and second objects in said first direction is measured by the steps of:

applying a signal to said first electrode;
applying a signal to said second electrode;
obtaining a first signal derived from a signal coupled to said coupling electrode from the signal applied to said first electrode;
obtaining a second signal derived from a signal coupled to said coupling electrode from the signal applied to said second electrode; and
comparing a property of said first signal to a property of said second signal.

69. The method of claim 64 wherein the relative position between said first and second objects in said first direction is measured by the steps of:

applying a signal to said coupling electrode;
obtaining a first signal derived from a signal coupled to said first electrode from the signal applied to said coupling electrode;
obtaining a second signal derived from a signal coupled to said second electrode from the signal applied to said coupling electrode; and
comparing a property of said first signal to a property of said second signal.

70. The method of claim 64 wherein said step of comparing the capacitive coupling includes the steps of:

applying signals to said first and second electrodes;
mounting at least one pickup electrode on said first object so that it is adjacent but spaced apart from said coupling electrode in a third direction that is orthogonal to said first direction; and
detecting a signal on said pickup electrode resulting from the signal applied to said first and second electrodes being coupled from said first and second electrodes to said coupling electrode, and from said coupling electrode to said pickup electrode.

71. A system for measuring the relative position between first and second objects in a first direction, said system comprising:

at least one row of electrodes mounted on said first object, said row containing a first electrode and at least a second electrode of substantially equal length in said first direction, said row and the electrodes in said row having an elongated configuration with a longitudinal axis extending in said first direction, the dimension in a second direction of said first electrode relative to the dimension in said second direction of said second electrode varying along said first direction, said second direction being orthogonal to said first direction;

a coupling electrode mounted on said second object adjacent said row of electrodes so that said coupling electrode is spaced apart from said row of electrodes in a third direction that is orthogonal to said first and second directions; and electronic means for comparing a first signal that is a function of the capacitive coupling between said coupling electrode and said first electrode in said row with a second signal that is a function of the capacitive coupling between said coupling electrode and said second electrode in said row, thereby measuring the relative positions between said first and second objects in said first direction.

72. The system of claim 71 wherein said first and second electrodes have a triangular configuration so that the capacitive coupling between said coupling electrode and said first and second electrodes varies in a linear manner in said first direction.

73. The system of claim 71 wherein said first and second electrodes have a periodic configuration so that the capacitive coupling between said coupling electrode and said first and second electrodes varies in a periodic manner in said first direction.

74. The system of claim 73 wherein first and second rows of electrodes are mounted on said first object with said rows of electrodes and the electrodes in said rows of electrodes being positioned adjacent each other in a second direction orthogonal to said first direction, the spatial frequency of the electrodes in adjacent first and second rows differing from each other in a predetermined manner.

75. The system of claim 74 wherein said electronic means further includes means for measuring the relative position between said first and second objects in said first direction over a range covering a plurality of cycles of the periodic electrodes in said first and second rows, said means comprising:

first measuring means for determining the spatial phase of the periodic electrodes in said first row by comparing a plurality of signals that are functions of the respective capacitive coupling between said coupling electrode and each of the electrodes in said first row;

second measuring means for determining the spatial phase of the periodic electrodes in said second row by comparing a plurality of signals that are functions of the respective capacitive coupling between said coupling electrode and each of the electrodes in said second row;

comparison means for comparing the spatial phase of the periodic electrodes in said first row with the spatial phase of the periodic electrodes in said second row; and analysis means for determining the relative position between said first and second objects in said first direction within said range from the difference in the spatial phases of the electrodes in first and second rows and the spatial periods of the periodic electrodes in said first and second rows.

76. The system of claim 75 wherein said spatial frequency in said first row is a higher frequency that in said second row, and wherein said analysis means makes said relative position determination in said first direction to define position with relatively coarse resolution over a relatively long range, and corrects and augments said coarse position information with the spatial phase information from said first measuring means to determine position to a relatively finer resolution and accuracy and determine position unambiguously and absolutely in said first direction.

77. The system of claim 71 wherein said electronic means comprises:

first signal generating means for applying a signal to said first electrode;

second signal generating means for applying a signal to said second electrode;

first measuring means for determining a property of a first signal derived from a signal coupled to said coupling electrode from the signal applied to said first electrode;

second measuring means for determining a property of a second signal derived from a signal coupled to said coupling electrode from the signal applied to said second electrode; and comparison means for comparing the property of said first signal to the property of said second signal.

78. The system of claim 71 wherein said electronic means comprise:

signal generating means for applying a signal to said coupling electrode;

first measuring means for determining a property of a first signal derived from a signal coupled to said first electrode from the signal applied to said coupling electrode;

second measuring means for determining the property of a second signal derived from a signal coupled to said second electrode from the signal applied to said coupling electrode; and comparison means for comparing the property of said first signal to the property of said second signal.

79. The system of claim 71, further including a pickup electrode mounted on said first object so that it is adjacent but spaced apart from said coupling electrode in a third direction that is orthogonal to said first direction, and wherein said electronic means needs no connection to said coupling electrode and further includes means for comparing a first signal derived from a signal applied to said first electrode and coupled from said first electrode to said coupling electrode, and from said coupling electrode to said pickup electrode, with a second signal derived from a signal applied to said second electrode and coupled from said second electrode to said coupling electrode and to said pickup electrode.

80. A method of measuring the relative position between first and second objects in a first direction, said method comprising:

mounting a plurality of electrodes on said first object so that said electrodes are positioned adjacent each other in said first direction with the spacing between each of said electrodes and any adjacent electrode being substantially constant, the dimensions in said first direction of each of said electrodes being constant along the length of said electrodes in a second direction orthogonal to said first direction;

mounting a coupling electrode having a periodic configuration on said second object adjacent the electrodes mounted on said first object so that said coupling electrode is spaced apart from said electrodes in a third direction that is orthogonal to said first direction and said second direction, said coupling electrode having a dimension in said first direction that is at least equal to the distance between one edge of an electrode that receives a first electrical signal during a measurement in said first direction and the corresponding edge of a corresponding electrode that receives a second electrical signal during a measurement in said first direction; and comparing the capacitive coupling between said coupling electrode and at least one of said electrodes with the capacitive coupling between said coupling electrode and at least one other of said electrodes, the capacitive coupling between said coupling electrode and said electrode varying in a periodic manner when said objects move relative to each other in said first direction, thereby measuring the relative positions between said first and second objects in said first direction.

81. A method of measuring the relative position between first and second objects in a first direction, said method comprising:

mounting a plurality of electrodes on said first object so that said electrodes are positioned adjacent each other in said first direction with the spacing between each of said electrodes and any adjacent electrode being substantially constant, the dimensions in said first direction of each of said electrodes being constant along the length of said electrodes in a second direction orthogonal to said first direction;

mounting a coupling electrode on said second object adjacent the electrodes mounted on said first object so that said coupling electrode is spaced apart from said electrodes in a third direction that is orthogonal to said first direction and said second direction, said coupling electrode having a dimension in said first direction that is substantially equal to an integer multiple "N," N greater than or equal to 1, times the distance in said first direction between one edge of a row that receives a first electrical signal during measurement in said first direction and the corresponding edge of a corresponding row that receives a second electrical signal during measurement in said first direction; and comparing the capacitive coupling between said coupling electrode and at least one of said electrodes with the capacitive coupling between said coupling electrode and at least one other of said electrodes, thereby measuring the relative positions between said first and second objects in said first direction.

82. A method of measuring the relative position between first and second objects in a first direction, said method comprising:

mounting a plurality of electrodes on said first object so that said electrodes are positioned adjacent each other in said first direction with the spacing between each of said electrodes and any adjacent electrode being substantially constant, the dimensions in said first direction of each of said electrodes being constant along the length of said electrodes in a second direction orthogonal to said first direction;

mounting a coupling electrode on said second object adjacent the electrodes mounted on said first object so that said coupling electrode is spaced apart from said electrodes in a third direction that is orthogonal to said first direction, said coupling electrode having a dimension in said first direction that is at least equal to the distance between one edge of an electrode that receives a first electrical signal during a measurement in said first direction and the corresponding edge of a corresponding electrode that receives a second electrical signal during a measurement in said first direction; and comparing the capacitive coupling between said coupling electrode and at least one of said electrodes with the capacitive coupling between said coupling electrode and at least one other of said electrodes by the steps of:

applying signals to said electrodes;

mounting at least one pickup electrode on said first object so that it is spaced apart from said coupling electrode in a third direction that is orthogonal to said first direction; and detecting a signal on said pickup electrode resulting from the signal applied to said electrodes being coupled from said electrodes to said coupling electrode, and from said coupling electrode to said pickup electrode, thereby measuring the relative positions between said first and second objects in said first direction.

83. A method of measuring the relative position between first and second objects in a first direction, said method comprising:

mounting a plurality of electrodes on said first object so that said electrodes are positioned adjacent each other in said first direction with the spacing between each of said electrodes and any adjacent electrode being substantially constant, the dimensions in said first direction of each of said electrodes being constant along the length of said electrodes in a second direction orthogonal to said first direction;

mounting a coupling electrode on said second object adjacent the electrodes mounted on said first object so that said coupling electrode is spaced apart from said electrodes in a third direction that is orthogonal to said first direction and said second direction;

dividing said coupling electrode into at least two subelectrodes, each having substantially the same dimension in said first direction that is substantially equal to an integer multiple "N," N greater than or equal to 1, of the distance in said first direction between one edge of a row that receives a first electrical signal during measurement in said first direction and the corresponding edge of a corresponding row that receives a second electrical signal during measurement in said first direction; and comparing the capacitive coupling between at least one subelectrode of said coupling electrode and the adjacent electrodes in at least one of said rows with the capacitive coupling between at least one subelectrode of said coupling electrode and the adjacent electrodes in at least one other of said rows to measure the relative positions between said first and second objects in said first direction.

84. A method of measuring the relative position between first and second objects in a first direction, said method comprising:

mounting a plurality of electrodes on said first object so that said electrodes are positioned adjacent each other in said first direction with the spacing between each of said electrodes and any adjacent electrode being substantially constant, the dimensions in said first direction of each of said electrodes being constant along the length of said electrodes in a second direction orthogonal to said first direction;

mounting a coupling electrode on said second object adjacent the electrodes mounted on said first object so that said coupling electrode is spaced apart from said electrodes in a third direction that is orthogonal to said first direction and said second direction, said coupling electrode having a dimension in said first direction that is at least equal to the distance between one edge of an electrode that receives a first electrical signal during a measurement in said first direction and the corresponding edge of a corresponding electrode that receives a second electrical signal during a measurement in said first direction, each of said coupling electrodes being divided into a plurality of subelectrodes positioned adjacent each other in said first direction; and comparing the capacitive coupling between at least one subelectrode of said coupling electrode and adjacent electrodes on said first object with the capacitive coupling between at least one other subelectrode of said coupling electrode and adjacent electrodes on said first object, thereby measuring the relative positions between said first and second objects in said first direction.

85. The method of claim 84 wherein the sum of the dimensions in said second direction of all of said coupling subelectrodes that are used to measure in said first direction is constant along said first direction.

86. The method of claim 84 wherein said subelectrodes are adjacently placed at a minimum spacing in said first direction which is sufficient to maintain electrical isolation.

87. A system for measuring the relative position between first and second objects in a first direction, said system comprising:

a plurality of electrodes mounted on said first object so that said electrodes are positioned adjacent each other in said first direction with the spacing between each of said electrodes and any adjacent electrode being substantially constant, the dimensions in said first direction of each of said electrodes being constant along the length of said electrodes in a second direction orthogonal to said first direction;

a coupling electrode mounted on said second object adjacent the electrodes mounted on said first object so that coupling electrode is spaced apart from said electrodes in a third direction that is orthogonal to said first direction and said second direction, said coupling electrode being divided into a plurality of subelectrodes positioned adjacent each other in said first direction, each of said subelectrodes having a dimension in said first direction that at least as large as the dimension of said electrodes in said first direction; and electronic means for comparing a signal that is a function of the capacitive coupling between at least one subelectrode of said coupling electrode and adjacent electrodes on said first object with a signal that is a function of the capacitive coupling between at least one other subelectrode of said coupling electrode and adjacent electrodes on said first object, thereby measuring the relative positions between said first and second objects in said first direction.

88. A system for measuring the relative position between first and second objects in a first direction, said system comprising:

a plurality of electrodes mounted on said first object so that said electrodes are positioned adjacent each other in said first direction with the spacing between each of said electrodes and any adjacent electrode being substantially constant, the dimensions in said first direction of each of said electrodes being constant along the length of said electrodes in a second direction orthogonal to said first direction;

a coupling electrode mounted on said second object adjacent the electrodes mounted on said first object so that coupling electrode is spaced apart from said electrodes in a third direction that is orthogonal to said first direction and said second direction, said coupling electrode having a dimension in said first direction that is at least equal to the distance between one edge of an electrode that receives a first electrical signal during a measurement in said first direction and the corresponding edge of a corresponding electrode that receives a second electrical signal during a measurement in said second direction;

a pickup electrode mounted on said first object so that it is spaced apart from said coupling electrode in a third direction that is orthogonal to said first direction and said second direction; and electronic means for comparing a first signal that is a function of the capacitive coupling between said coupling electrode and at least one of said electrodes with a second signal that is a function of the capacitive coupling between said coupling electrode and at least one other of said electrodes, said capacitive coupling being measured by measuring the magnitude of a signal derived from a signal applied to said electrodes, and coupled from said electrodes to said coupling electrode, and from said coupling electrode to said pickup electrode, thereby measuring the relative positions between said first and second objects in said first direction.

89. A system for measuring the relative position between first and second objects in a first direction, said system comprising:

a plurality of electrodes mounted on said first object so that said electrodes are positioned adjacent each other in said first direction with the spacing between each of said electrodes and any adjacent electrode being substantially constant, the dimensions in said first direction of each of said electrodes being constant along the length of said electrodes in a second direction orthogonal to said first direction;

a coupling electrode mounted on said second object adjacent the electrodes mounted on said first object so that coupling electrode is spaced apart from said electrodes in a third direction that is orthogonal to said first direction and said second direction, said coupling electrode being divided into at least two subelectrodes, each having substantially the same dimension in said first direction that is substantially equal to an integer multiple "N", N greater than or equal to 1, of the distance in said first direction between one edge of a row that receives a first electrical signal during measurement in said first direction and the corresponding edge of a corresponding row that receives a second electrical signal during measurement in said first direction; and wherein said first signal is a function of the capacitive coupling between at least one subelectrode of said coupling electrode and the adjacent said electrode and said second signal is a function of the capacitive coupling between at least one subelectrode and the adjacent said at least one other electrode, thereby measuring the relative positions between said first and second objects in said first direction.

90. A system for measuring the relative position between first and second objects in a first direction, said system comprising:

a plurality of electrodes mounted on said first object so that said electrodes are positioned adjacent each other in said first direction with the spacing between each of said electrodes and any adjacent electrode being substantially constant, the dimensions in said first direction of each of said electrodes being constant along the length of said electrodes in a second direction orthogonal to said first direction;

a coupling electrode mounted on said second object adjacent the electrodes mounted on said first object so that coupling electrode is spaced apart from said electrodes in a third direction that is orthogonal to said first direction and said second direction, said coupling electrode having a dimension in said first direction that is substantially equal to an integer multiple "N," N greater than or equal to 1, times the distance in said first direction between one edge of a row that receives a first electrical signal during measurement in said first direction and the corresponding edges of a corresponding row that receives a second electrical signal during measurement in said first direction; and electronic means for comparing a first signal that is a function of the capacitive coupling between said coupling electrode and at least one of said electrodes with a second signal that is a function of the capacitive coupling between said coupling electrode and at least one other of said electrodes, thereby measuring the relative positions between said first and second objects in said first direction.

* * * * *

UNITED STATES PATENT AND TRADEMARK OFFICE
CERTIFICATE OF CORRECTION

PATENT NO. : 5,239,307
DATED : August 24, 1993
INVENTOR(S) : Ingvar Andermo

It is certified that error appears in the above-identified patent and that said Letters Patent is hereby corrected as shown below:

In column 27, claim 33, line 36, please delete "electrodes" and substitute therefor --electrode--.

In column 32, claim 61, line 13, please delete "time" and substitute therefor --times--.

Signed and Sealed this

Nineteenth Day of April, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,239,307

DATED : August 24, 1993

INVENTOR(S) : Ingvar Andermo and Victor E. Belmondo

It is certified that error appears in the above-indentified patent and that said Letters Patent is hereby corrected as shown below:

On the title page item [75] under the subtitle "Inventor:", please add the name of the second inventor, --Victor E. Belmondo--.

Signed and Sealed this

Twenty-seventh Day of September, 1994

Attest:

BRUCE LEHMAN

*Attesting Officer*  *Commissioner of Patents and Trademarks*